United States Patent
Harada et al.

(10) Patent No.: US 12,010,534 B2
(45) Date of Patent: Jun. 11, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 290 days.

(21) Appl. No.: 16/337,612

(22) PCT Filed: Sep. 29, 2017

(86) PCT No.: PCT/JP2017/035388
§ 371 (c)(1),
(2) Date: Mar. 28, 2019

(87) PCT Pub. No.: WO2018/062458
PCT Pub. Date: Apr. 5, 2018

(65) Prior Publication Data
US 2020/0037184 A1 Jan. 30, 2020

(30) Foreign Application Priority Data
Sep. 29, 2016 (JP) ................ 2016-192024

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0082* (2013.01); *H04L 5/0094* (2013.01); *H04W 72/23* (2023.01); *H04W 80/08* (2013.01)

(58) Field of Classification Search
CPC ..... H04W 24/08; H04W 24/02; H04W 24/10; H04W 80/08; H04W 72/042;
(Continued)

(56) References Cited

U.S. PATENT DOCUMENTS

| 9,591,636 B2* | 3/2017 | Papasakellariou .. H04W 72/042 |
| 2008/0064434 A1* | 3/2008 | Voyer .................. H04W 24/00 455/550.1 |

(Continued)

FOREIGN PATENT DOCUMENTS

| EP | 3566516 A1 | 11/2019 |
| JP | 2013502841 A | 1/2013 |

(Continued)

OTHER PUBLICATIONS

International Search Report issued for PCT/JP2017/035388, dated Dec. 19, 2017 (5 pages).

(Continued)

*Primary Examiner* — Un C Cho
*Assistant Examiner* — Rasha K Fayed
(74) *Attorney, Agent, or Firm* — Osha Bergman Watanabe & Burton LLP

(57) ABSTRACT

The present invention is designed so that DL controls channels are monitored adequately even when the unit of scheduling in the time direction is subject to control. According to the present invention, a user terminal monitors a downlink (DL) control channel and receives downlink control information (DCI), and this user terminal has a receiving section that receives time interval information, which shows a time interval for monitoring the DL control channel, and a control section that controls monitoring of the DL control channel based on the time interval information.

7 Claims, 15 Drawing Sheets

(51) Int. Cl.
*H04W 72/23* (2023.01)
*H04W 80/08* (2009.01)

(58) Field of Classification Search
CPC . H04W 72/12; H04W 72/04; H04W 72/0446; H04W 72/1289; H04W 72/14; H04W 72/0426; H04W 72/1273; H04W 72/1205; H04W 72/0216; H04W 72/085; H04W 72/10; H04W 72/1242; H04W 72/1268; H04W 72/1284; H04W 72/1252; H04W 72/005; H04W 72/046; H04W 52/0216; H04W 52/02; H04W 52/0225; H04W 52/146; H04W 52/34; H04W 52/50; H04W 56/0045; H04W 56/00; H04W 28/06; H04W 28/0278; H04W 28/04; H04W 28/22; H04W 28/18; H04W 88/085; H04W 88/02; H04W 76/27; H04W 76/28; H04W 16/14; H04W 16/02; H04W 84/045; H04W 84/047; H04W 4/025; H04L 5/0082; H04L 5/0094; H04L 5/0044; H04L 5/0053; H04L 5/00; H04L 5/0091; H04L 5/0055; H04L 5/0035; H04L 5/001; H04L 5/0023; H04L 5/0037; H04L 5/0048; H04L 5/0057; H04L 5/0007; H04L 5/005; H04L 5/0039; H04L 5/0064; H04L 5/0092; H04L 1/1887; H04L 1/1829; H04L 1/1854; H04L 1/1867; H04L 1/00; H04L 1/0027; H04L 1/0003; H04L 1/0009; H04L 1/0026; H04L 1/06; H04L 1/1819; H04L 1/1822; H04L 12/189; H04L 12/18; H04B 7/0413; H04B 7/0417; H04B 7/0426; H04B 7/0626; Y02D 70/1264; Y02D 70/00; Y02D 70/1262; Y02D 70/21; Y02D 70/1242; Y02D 70/1244; Y02D 70/1246; Y02D 70/24; Y02D 70/23

See application file for complete search history.

(56) References Cited

U.S. PATENT DOCUMENTS

| | | | | |
|---|---|---|---|---|
| 2011/0044261 A1* | 2/2011 | Cai | H04L 5/0055 | 370/329 |
| 2011/0064037 A1* | 3/2011 | Wei | H04L 5/0035 | 370/329 |
| 2011/0292854 A1* | 12/2011 | Terry | H04L 5/001 | 370/311 |
| 2012/0190395 A1* | 7/2012 | Pan | H04L 5/0064 | 455/509 |
| 2013/0230030 A1* | 9/2013 | Papasakellariou | H04W 72/042 | 370/336 |
| 2015/0043461 A1* | 2/2015 | Sachs | H04W 72/12 | 370/329 |
| 2015/0092563 A1* | 4/2015 | Tabet | H04W 72/1289 | 370/241 |
| 2015/0200741 A1* | 7/2015 | Liu | H04J 11/0086 | 370/312 |
| 2015/0250017 A1* | 9/2015 | Ingale | H04W 72/042 | 370/280 |
| 2015/0358848 A1* | 12/2015 | Kim | H04W 56/001 | 370/252 |
| 2016/0143029 A1* | 5/2016 | Goto | H04W 72/0446 | 370/329 |
| 2016/0157217 A1 | 6/2016 | Xue et al. | | |
| 2016/0330761 A1* | 11/2016 | Svedman | H04W 72/0426 | |
| 2016/0366604 A1* | 12/2016 | Devarasetty | H04W 74/002 | |
| 2017/0201968 A1* | 7/2017 | Nam | H04L 5/0048 | |
| 2017/0366377 A1* | 12/2017 | Papasakellariou | H04L 5/005 | |
| 2018/0019843 A1* | 1/2018 | Papasakellariou | H04W 72/1278 | |
| 2018/0070369 A1* | 3/2018 | Papasakellariou | H04W 72/20 | |
| 2018/0213457 A1* | 7/2018 | Tang | H04W 36/0083 | |
| 2018/0302926 A1* | 10/2018 | Bhorkar | H04L 5/005 | |
| 2019/0089436 A1* | 3/2019 | Wei | H04L 1/16 | |
| 2019/0124633 A1* | 4/2019 | Hang | H04L 5/0037 | |
| 2019/0141679 A1* | 5/2019 | He | H04L 5/0007 | |
| 2019/0268924 A1* | 8/2019 | Kim | H04L 5/0078 | |
| 2019/0327757 A1 | 10/2019 | Oteri et al. | | |
| 2019/0335528 A1* | 10/2019 | Bin Sediq | H04W 76/28 | |

FOREIGN PATENT DOCUMENTS

| | | |
|---|---|---|
| JP | 2015508265 A | 3/2015 |
| WO | 2014208426 A1 | 12/2014 |
| WO | 2015103383 A1 | 7/2015 |

OTHER PUBLICATIONS

Written Opinion issued for PCT/JP2017/035388, dated Dec. 19, 2017 (4 pages).
BGPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended Search Report issued in European Application No. 17856407.6, dated Apr. 7, 2020 (9 pages).
3GPP TSG RAN WG1 Meeting #86; R1-166882; "Overall discussion on URLLC;" LG Electronics; Aug. 22-26, 2016; Gothenburg, Sweden (5 pages).
3GPP TSG RAN WG1 Meeting #86; R1-166886; "Handling URLLC in new RAT;" LG Electronics; Aug. 22-26, 2016; Gothenburg, Sweden (5 pages).
Office Action in counterpart European Patent Application No. 17 856 407.6 dated Jun. 25, 2021 (12 pages).
Ericsson; "On signaling in DL LAA subframes"; 3GPP TSG RAN WG1 Meeting #83, R1-157267; Anaheim, USA; Nov. 16-20, 2015 (5 pages).
Qualcomm Incorporated; "Forward compatibility consideration for NR frame structure"; 3GPP TSG RAN WG1 #86, R1-166346; Gothenburg, Sweden; Aug. 22-26, 2016 (2 pages).
Qualcomm Incorporated; "Control Interval and Scheduling Interval"; 3GPP TSG-RAN WG1 #86, R1-166361; Gothenburg, Sweden; Aug. 22-26, 2016 (7 pages).
Office Action issued in Japanese Application No. 2018-542904; dated Nov. 30, 2021 (6 pages).
Office Action issued in Indian Application No. 201917013048; dated Dec. 6, 2021 (7 pages).
Extended European Search Report issued in European Application No. 21212791.4 mailed on Jan. 11, 2022 (15 pages).
Huawei, HiSilicon, "Discussion on timing relations for NR frame structure" 3GPP TSG RAN WG1 Meeting #86, R1-166105, Gothenburg, Sweden, Aug. 22-26, 2016 (4 pages).
Intel Corporation, "On reducing processing time for 1ms TTI", 3GPP TSG-RAN WG1 #86, R1-166540, Goteborg, Sweden, Aug. 22-26, 2016 (3 pages).
NTT Docomo, Inc., "Views on shortened processing time for 1ms TTI", 3GPP TSG RAN WG1 Meeting #86, R1-167366, Gothenburg, Sweden, Aug. 22-26, 2016 (3 pages).
Office Action issued in counterpart Chinese Patent Application No. 201780060559.5 mailed on Mar. 2, 2022 (24 pages).

* cited by examiner

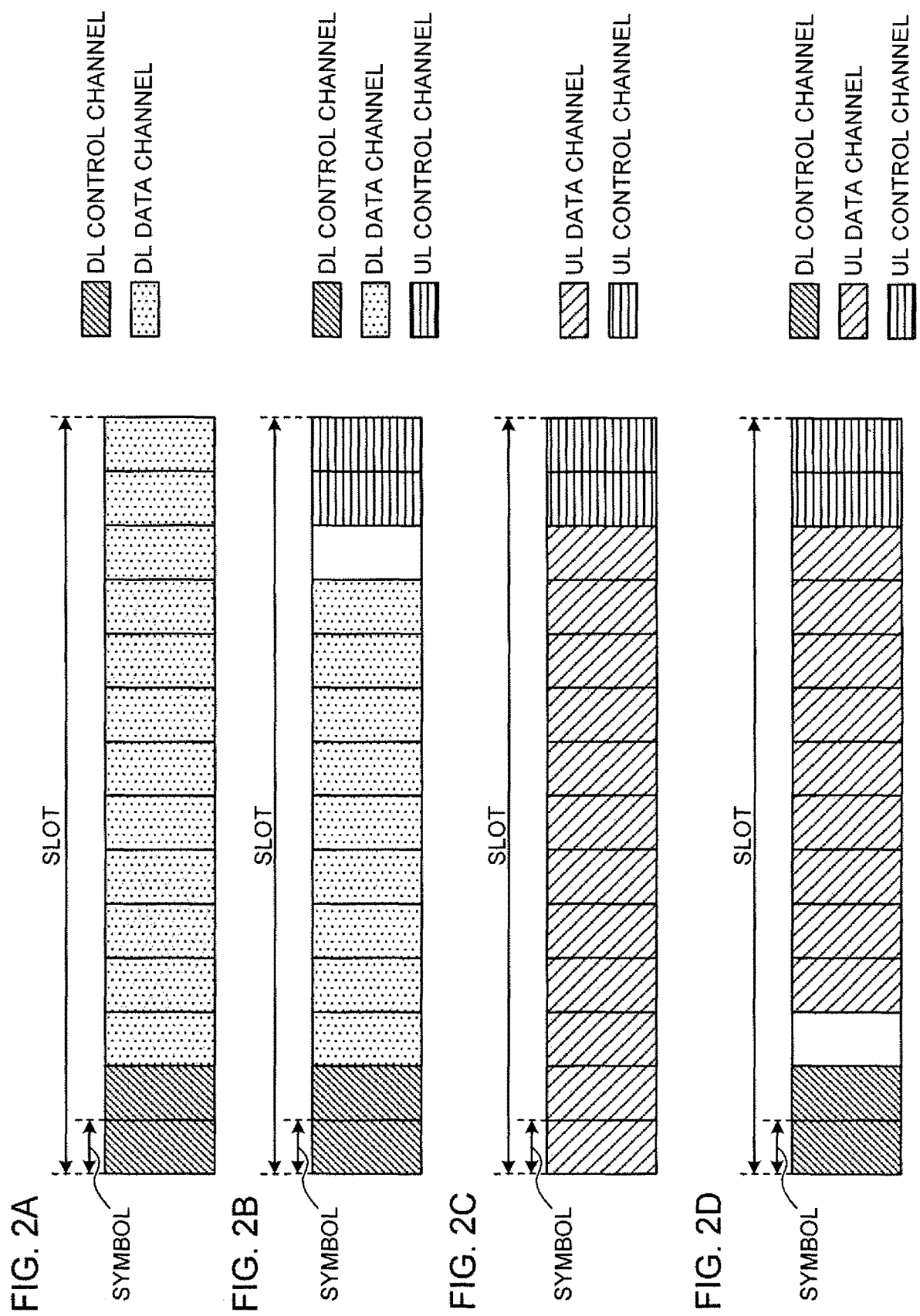

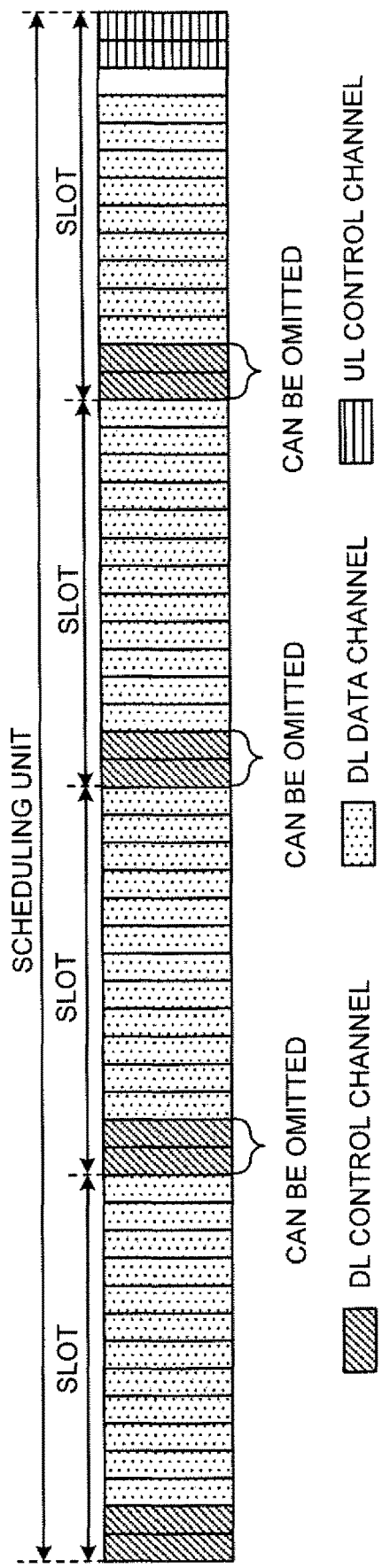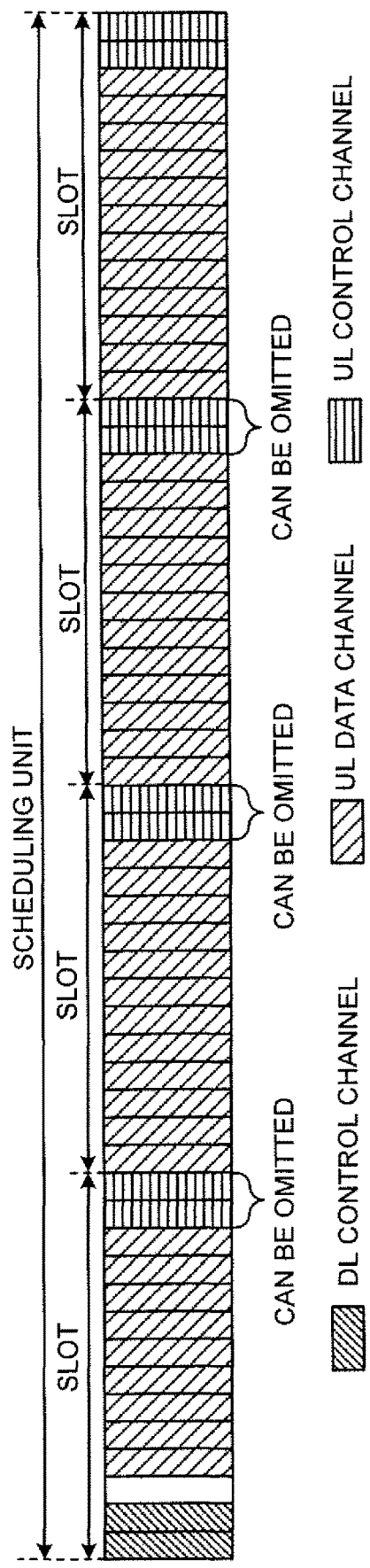

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 13 and earlier versions), downlink (DL) and/or uplink (UL) communication are carried out by using 1-ms transmission time intervals (TTIs) (also referred to as "subframes" and so on). This TTI of 1 ms serves as the unit of time for transmitting one channel-encoded data packet. Furthermore, this 1-ms TTI serves as the unit of scheduling in the time direction, serves as the processing unit in link adaptation, retransmission control (HARQ (Hybrid Automatic Repeat reQuest)), and so forth.

Furthermore, in existing LTE systems (for example, LTE Rel. 13 or earlier versions), for each TTI of 1 ms, a user terminal monitors the DL control channel that is allocated in a predetermined number of symbols (for example one, two or three symbols) at the top of the TTI (this is also referred to as "blind decoding"), and detects downlink control information (DCI) addressed to the user terminal.

Based on the DCI that is detected, the user terminal controls the receipt of a DL data channel (also referred to as "PDSCH (Physical Downlink Shared CHannel)," "DL shared channel," etc.) and/or the transmission of a UL data channel (also referred to as "PDSCH (Physical Uplink Shared CHannel)," "UL shared channel," etc.), where these channels are scheduled in 1-ms TTI units.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to accommodate a number of services with different requirements (including, for example, eMBB (enhanced Mobile Broad Band), IoT (Internet of Things), mMTC (massive Machine-Type Communication), URLLC (Ultra-Reliable and Low Latency Communication) and so forth) based on a single framework.

So, envisaging future radio communication systems, studies are in progress to multiplex a number of user terminals that use different numerologies, in the same carrier (also referred to as "component carrier (CC)," "cell," "NR carrier" and so forth). Here, a numerology refers to a parameter that is defined in the frequency and/or time direction (for example, at least one of subcarrier spacing the duration of symbols and the time length of cyclic prefixes (CPs) (CP length)).

In this way, in future radio communication systems, in which user terminals to use one or more numerologies are likely to be multiplexed, it is desirable if the unit of scheduling in the time direction can be controlled flexibly, and not fixed (at 1 ms) as in existing LTE systems (for example, LTE Rel. 13 or earlier versions). On the other hand, if the unit of scheduling is subject to control, user terminals may not be able to monitor DL control channels adequately.

The present invention has been made in view of the above, and it is therefore an object of the present invention to provide a user terminal and a radio communication method, whereby DL control channels can be monitored adequately even when the unit of scheduling in the time direction is subject to control.

Solution to Problem

According to the present invention, a user terminal monitors a downlink (DL) control channel and receives downlink control information (DCI), and this user terminal has a receiving section that receives time interval information, which shows a time interval for monitoring the DL control channel, and a control section that controls monitoring of the DL control channel based on the time interval information.

Advantageous Effects of Invention

According to the present invention, DL control channels can be monitored adequately even when the unit of scheduling in the time direction is subject to control.

BRIEF DESCRIPTION OF DRAWINGS

FIGS. 2A to 2D are diagrams to show examples of slot structures based on common numerologies;

FIGS. 3A and 3B are diagrams to show examples of scheduling units constituted by multiple slots;

DESCRIPTION OF EMBODIMENTS

Figure 1:
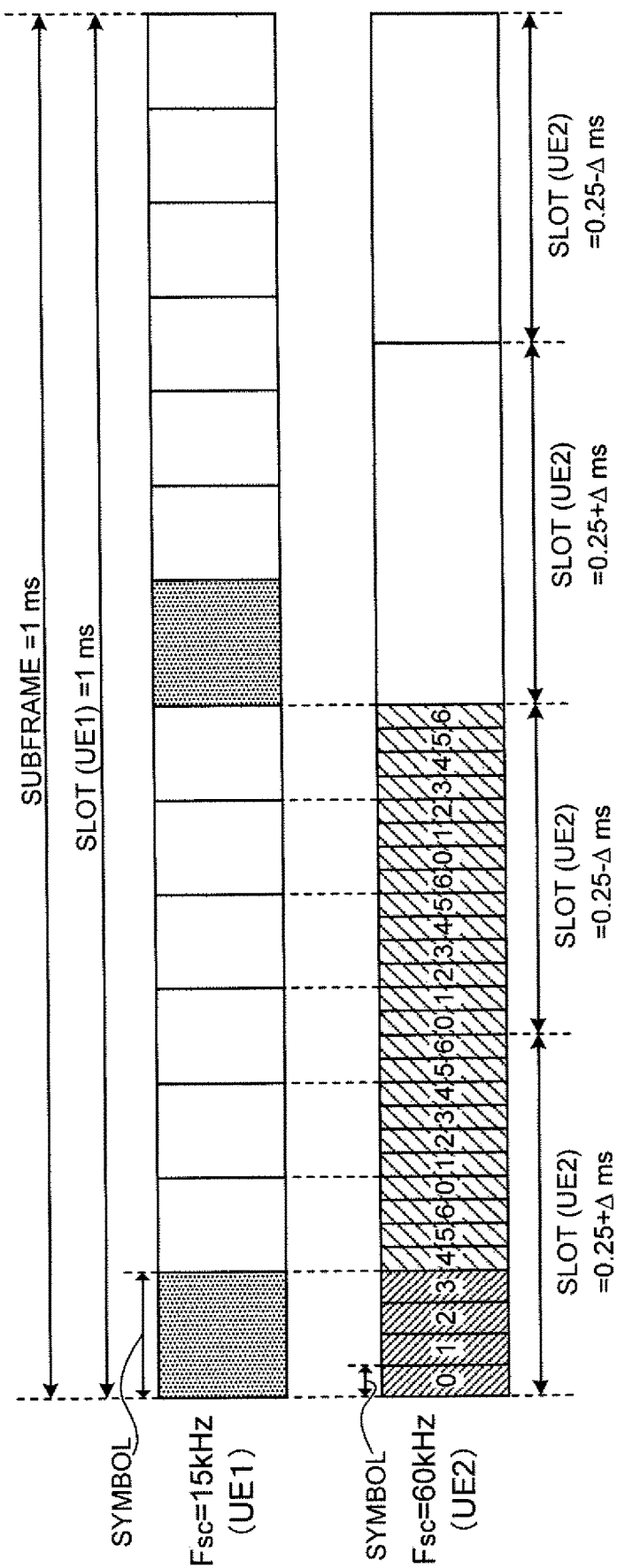
FIG. 1 is a diagram to show examples of frame structures where symbol boundaries are aligned.

In existing LTE systems (for example, Rel. 13 or earlier versions), a TTI of 1 ms (one subframe) serves as the unit of scheduling for DL data channels and/or UL data channels (DL/UL data channels) in the time direction (this unit is also referred to as the "scheduling periodicity," the "time resource allocation unit," and so on). One subframe is 1 ms and comprised of two slots (one slot=0.5 ms).

This 1-ms TTI (one subframe) is comprised of fourteen symbols (seven symbols per slot) when the cyclic prefixes (CPs), which are added to each symbol, are normal CPs, and comprised of twelve symbols (six symbols per slot) when the CPs are enhanced CPs.

Also, in existing LTE systems, subcarriers are used at a subcarrier spacing of 15 kHz. Frequency resources are allocated by using one resource block (physical resource block (PRB), 180 kHz), which is constituted by twelve subcarriers, as one unit (that is, by using one PRB as a scheduling unit in the frequency direction).

Thus, while a single numerology is used in existing LTE systems (for example, Rel. 13 or earlier versions), in future radio communication systems (for example, 5G or NR), a number of different numerologies may be multiplexed (for example, by time division multiplexing (TDM) and/or frequency division multiplexing (FDM)) in the same carrier (which may be, for example, an NR carrier, a component carrier (CC), a cell, and so forth).

Thus, in future radio communication systems in which a number of different numerologies might be multiplexed, there is a possibility that resource units in the time and/or frequency direction cannot be configured in the same way as in existing LTE systems. This is because subcarrier spacing and symbol length are reciprocal, and, when the subcarrier spacing varies between multiple numerologies, it then necessarily follows that subframes or slots, constituted by the same number of symbols, will have different time lengths.

Therefore, envisaging future radio communication systems, designs of time resource units (also referred to as "frame structures" and so forth) that are suited for multiplexing of one or more numerologies are under study. For example, in future radio communication systems, time resource units that maintain a constant time length in one or more numerologies (numerology-common time resource units), and time resource units that assume different time lengths between numerologies (numerology-specific time resource units) may be provided.

A numerology-common time resource unit maintains the same time length (absolute time) among a number of different numerologies, and may be referred to as, for example, a "subframe," and/or the like. This subframe may be defined by the time length (also referred to as "subframe length," "subframe duration," etc.) of a predetermined number X (X≥1) of symbols in the numerology that serves as the basis (hereinafter referred to as the "reference numerology").

For example, if the subcarrier spacing is 15 kHz and X=14 holds in the reference numerology, the subframe length is 1 ms. Also, in one subframe, one or more DL/UL data channels (data signals) may be scheduled. Also, in one subframe, one or more DL control channels and/or UL control channels (DL/UL control channels) (control signals) may be received and/or transmitted.

By contrast with this, a numerology-specific time resource unit assumes different time lengths between a number of different numerologies, and may be referred to as, for example, a "slot" and so on. This slot may be defined by the time length of a predetermined number Y (Y≥1) of symbols (also referred to as the "slot length," "slot duration," etc.) in the numerology which a user terminal uses to communicate (for example, to transmit/receive DL/UL data channels).

For example, Y may be a fixed value (for example, 14 or 7), or a value that is configured via higher layer signaling and/or physical layer signaling. Among multiple user terminals using different numerologies (for example, using different subcarrier spacings and/or symbol lengths), if Y is the same value, the slot length is different. Note that the length of a slot may be made the same among multiple user terminals that use different numerologies by changing the value of Y.

Also, a DL/UL control channel (control signal) may be allocated in a predetermined number of symbols at the top and/or end of a slot. Also, a slot can be used for the DL and/or for the UL. To be more specific, a slot may contain symbols for the DL or symbols for the UL, or a slot may contain both symbols for the DL and symbols for the UL. Furthermore, a slot may be used as the unit of scheduling (scheduling periodicity) for UL/DL data channels in the time direction.

Also, a number of numerology-specific time resource units may be configured. For example, in addition to the slot described above, a mini-slot having a shorter a time length than the above slot may be introduced. A mini-slot may be defined by the time length (mini-slot length) of a smaller number of symbols than Y above. Also, a DL/UL control channel (control signal) may be allocated in a predetermined number of symbols at the top and/or end of a mini-slot.

Research is underway to support the above-described frame structures in future radio communication systems, and, meanwhile, studies are in progress to align the boundary of symbols between different numerologies (symbol level alignment).

FIG. 1 is a diagram to show examples of frame structures where symbol boundaries are aligned. FIG. 1 assumes that a user terminal (UE) 1 to use a subcarrier spacing of 15 kHz and a user terminal 2 to use a subcarrier spacing of 60 kHz communicate in the same carrier. Note that FIG. 1 is simply an example, and it is also possible to communicate at subcarrier spacings other than 15 kHz and 60 kHz.

Also, referring to FIG. 1, the subcarrier spacing of the reference numerology is 15 kHz. A subframe is shown, which is constituted by X symbols of the reference numerology, where X=14. The length of the subframe is 1 ms, which is common between user terminals 1 and 2 that use different subcarrier spacings.

Also, referring to FIG. 1, a slot is constituted by Y symbols of the communicating numerology, and Y has the same value (=14) at both subcarrier spacings 15 kHz and 60 kHz. As shown in FIG. 1, the slot length when the subcarrier spacing is 15 kHz is the time length of fourteen symbols (=1 ms).

Meanwhile, in FIG. 1, the symbol length when the subcarrier spacing is 60 kHz is ¼ of the symbol length when the subcarrier spacing is 15 kHz, the slot length when the subcarrier spacing is 60 kHz is approximately ¼ of the slot length when the subcarrier spacing is 15 kHz. The first and eighth symbols in the slot for the subcarrier spacing of 15 kHz are configured longer than the other symbols, and, in order to align the boundaries of symbols between the subcarrier spacings of 15 kHz and 60 kHz, the length of a slot for the subcarrier spacing of 60 kHz is configured to 0.25+Δ or to 0.25−Δ (ms).

As shown in FIG. 1, even when different numerologies (in FIG. 1, different subcarrier spacings and different symbol lengths) are used, a slot is constituted by the same number Y of symbols, so that it is possible to use a common slot structure (also referred to as "DL/UL control channel," "reference signal," "symbol mapping for DL/UL data channel," "signal configuration," and so on) in different numerologies.

FIG. 2 is a diagram to show an example of a numerology-common slot structure. FIGS. 2A to 2D show examples of slot structures in the event one slot serves as the unit of scheduling in the time direction. Note that FIGS. 2A to 2D illustrate structures in which a slot is constituted by fourteen symbols (Y=14), but the value of Y is not limited to 14. Also, the slot structures (mapping of signals) shown in FIGS. 2A to 2D are simply examples, and these are by no means limiting.

Referring to FIG. 2A, the first slot structure may be used exclusively for the DL, a DL control channel may be mapped to a predetermined number of symbols (for example, two symbols) at the top of the slot, and a DL data channel may be mapped to the rest of the symbols.

Referring to FIG. 2B, the second slot structure (also referred to as "DL-centric," and the like) is mainly used for the DL, and a DL control channel is mapped to a predetermined number of symbols (for example, two symbols) at the top of the slot, and a DL data channel and a UL control channel are allocated to the rest of the symbols. The UL control channel may be mapped to a predetermined number of symbols (for example, two symbols) at the end of the slot, and a symbol for switching the DL to the UL may be provided between the DL data channel and the UL control channel.

Referring to FIG. 2C, the third slot structure is used exclusively for the UL, and a UL control channel and/or a UL reference signal (not shown) (for example, SRS (Sounding Reference Signal)) may be mapped to a predetermined number of symbols (for example, two symbols) at the end of the slot, and a UL data channel may be mapped to the rest of the symbols.

Referring to FIG. 2D, the fourth slot structure (also referred to as "UL-centric," and the like) is mainly used for the UL, and a DL control channel is mapped to a predetermined number of symbols (for example, two symbols) at the top of the slot, and a UL control channel and/or a UL reference signal (not shown) are mapped to a predetermined number of symbols (for example, two symbols) at the end of the slot. Furthermore, in this slot, a UL data channel is mapped to symbols other than the symbol for switching the DL to the UL.

If a slot is constituted by the same number Y of symbols between different numerologies, a common slot structure can be used, as shown in FIGS. 2A to 2D, even in different numerologies. Consequently, the load of designing future radio communication systems can be reduced. In this case, the wider the subcarrier spacing (the shorter the symbol length), the shorter the slot length.

When slots like above are used as scheduling units in the time direction, it is likely that, when the subcarrier spacing (the symbol length is shorter), UL/DL data channels are scheduled at shorter time intervals. However, even when different numerologies are used, the processing capabilities of radio base stations (eNodeBs and/or gNodeBs, for example) and/or user terminals (for example, UE (User Equipment)) do not change much. Consequently, if the subcarrier spacing widens, radio base stations and user terminals may have difficulty operating on one-slot scheduling units.

Therefore, it may be possible to use multiple slots as a scheduling unit in the time direction. FIG. 3 is a diagram to show an example of a scheduling unit constituted by a plurality of slots. Note that the scheduling unit shown in FIG. 3 is simply an example, and the combination of the number of slots constituting the scheduling unit and the slot structure is not limited to that shown in FIG. 3.

In FIG. 3A, an example of a DL scheduling unit is shown. For example, in FIG. 3A, one scheduling unit is constituted by three slots of the first slot structure shown in FIG. 2A and one slot of the second slot structure shown in FIG. 2B.

Referring to FIG. 3A, the DL control channel in a predetermined number of symbols (for example, two symbols) at the top of the scheduling unit may schedule DL data channels in at least one slot (in this case, in all of four slots) contained in this scheduling unit. Also, retransmission control information corresponding to the DL data channels (also referred to as "HARQ-ACK (Hybrid Automatic Repeat reQuest-ACKnowledgement)," "ACK/NACK (ACKnowledgement/Negative ACK)," "A/N" and so on) may be transmitted in the UL control channel of a predetermined number of symbols (for example, two symbols) at the end of the scheduling unit.

Furthermore, FIG. 3B, shows an example of a UL scheduling unit. For example, in FIG. 3B, one scheduling unit is constituted by one slot of the fourth slot structure shown in FIG. 2D and three slots of the third slot structure shown in FIG. 2C.

In FIG. 3B, the DL control channel in a predetermined number of symbols (for example, two symbols) at the top of the scheduling unit may schedule UL data channels in at least one slot (in this case, in all of four slots) contained in this scheduling unit.

Also, referring to FIG. 3B, in a predetermined number of symbols at the end of the scheduling unit, uplink control information (UCI) may be transmitted or a UL reference signal may be transmitted by a UL control channel. Furthermore, in this case, at least one of channel state information (CSI), the above-mentioned retransmission control information and a scheduling request (SR) may be contained in the UCI.

As shown in FIGS. 3A and 3B, by applying a scheduling unit to contain a plurality of slots (here, four slots) to user terminal 2 that adopts a subcarrier spacing of 60 kHz, it is possible to schedule DL/UL data channels for this user terminal 2 based on the same time length as that of user terminal 1 that adopts a subcarrier spacing of 15 kHz (see FIG. 1) and uses a single slot as a scheduling unit. In this way, even when numerologies in which the subcarrier spacing is wide (the symbol length is short) are used, it is possible to prevent malfunctions from occurring due to the processing capabilities of radio base stations and/or user terminals.

Meanwhile, as shown in FIGS. 3A and 3B, when a plurality of slots designed on assumption that one slot serves as a scheduling unit are combined and used as a scheduling unit, unnecessary overhead may be produced within this one scheduling unit constituted by multiple slots.

For example, in FIG. 3A, since the DL data channels of the first to fourth slots are scheduled by the DL control channel of the first slot from the left, the second to fourth DL control channels may be omitted. Also, referring to FIG. 3B, even when a user terminal transmits UL control channels on a per slot basis, if the radio base station operates based on the four-slot scheduling unit, the radio base station may not be able to identify the UL control channels in the first to third slots.

In addition, which time lengths of scheduling units a user terminal can support might depend on the user terminal's capability. For example, when a subcarrier spacing of 60 kHz is used, as shown in FIGS. 3A and 3B, there may be a user terminal that can operate by using one slot, not four slots, as a scheduling unit. Even though this user terminal may be capable of lowering latency, if four slots are configured as one scheduling unit in this user terminal, there is a possibility that the user terminal cannot have the effect of latency reduction.

Therefore, when user terminals using one or more numerologies are multiplexed, it is desirable to prevent malfunctions from occurring due to the processing capabilities of radio base stations and/or user terminals, and control scheduling units in the time direction in a flexible manner.

However, when the unit of scheduling in the time direction is subject to control, there is a risk that user terminals may be unable to monitor DL control channels adequately. So the present inventors have come up with the idea of reporting the time interval for monitoring DL control channels (monitoring periodicity) from the network (for example, a radio base station) to a user terminal so as to allow adequate monitoring of DL control channels even when the unit of scheduling in the time direction is subject to control.

Now, embodiments of the present invention will be described below in detail. In the following embodiments, subframes will be used as numerology-common time resource units, and slots will be used as numerology-specific time resource units, but the names of numerology-common time resource units and/or numerology-specific time resource units are by no means limited to these.

Also, according to the present embodiment, the number of symbols, or Y, constituting a slot is the same (that is, the slot length is different) between different numerologies, but this is by no means limiting. The present embodiment can be applied as appropriate to the case where the length of a slot is made the same between different numerologies by changing the number of symbols, or Y.

First Example

In a first example of the present invention, a user terminal receives time interval information (monitoring periodicity information), which shows the time interval for monitoring DL control channels (monitoring periodicity), and controls the monitoring of DL control channels based on the monitoring periodicity information. To be more specific, the user terminal blind-decodes a plurality of prospective resources for a DL control channel (prospective DL control channels) in the above monitoring periodicity, and detects DCI for this user terminal.

As for the monitoring periodicity here, a monitoring periodicity to be used in common by one or more user terminals may be provided, or monitoring periodicitys may be defined on a per user terminal basis. The common monitoring periodicity may be carrier-specific (a carrier may be also referred to as a "CC," a "cell" and so on), or may be common among one or more user terminals that are grouped. Monitoring periodicity information to show this monitoring periodicity is transmitted from the radio base station to the user terminal by using at least one of broadcast signals (for example, system information such as the MIB (Master Information Block), SIBs (System Information Blocks) and so forth), higher layer signaling (for example, RRC (Radio Resource Control) signaling, MAC (Media Access Control) signaling, etc.), and physical layer signaling.

Note that the monitoring periodicity may be equal to the time interval that serves as the unit of DL/UL channel scheduling, and may be referred to as the "scheduling periodicity," "scheduling unit," "fundamental scheduling periodicity" and the like.

In addition, the monitoring periodicity information may show the monitoring periodicity by using the number of slots in the reference numerology. The number of slots may be the number of slots in the reference numerology, or the number of slots in the numerology used by the user terminal. For example, the above-mentioned common monitoring periodicity may be indicated based on the number of slots in the reference numerology. Furthermore, the user terminal-specific monitoring periodicity mentioned above may be indicated by the number of slots in the numerology used by the user terminal.

Alternatively, the monitoring periodicity information may represent the monitoring periodicity in absolute time. For example, the monitoring periodicity information may show one of a plurality of absolute times (for example, 1 ms, 0.5 ms, etc.). These absolute times may be defined in the specification in advance, or may be configured in the user terminal by higher layer signaling. If multiple absolute times are configured by a broadcast signal or higher layer signaling, one of these absolute times may be indicated by physical layer signaling (DCI).

Alternatively, the monitoring periodicity information may represent the monitoring periodicity by using the number of subframes or subframe length. As mentioned earlier, the length of a subframe is defined so as to apply in common to different numerologies, so that the above common monitoring periodicity can be indicated easily.

The user terminal controls the timing for monitoring DL control channels based on the monitoring periodicity information described above. To be more specific, the user terminal may identify the first slot of the monitoring periodicity and monitor for a DL control channel in a predetermined symbol in the first slot. The user terminal does not need to monitor the DL control channel in the predetermined symbols in slots other than the first slot.

The user terminal may identify (locate) the first slot of the monitoring periodicity (or the timing of the first slot) based on the system frame number (SFN) and/or the boundary of the subframe. Alternatively, the user terminal may autonomously identify (locate) the first slot based on the timing at which DCI is detected by blind decoding.

Also, information to show whether it is necessary to monitor for DL control channels outside the monitoring periodicity (monitoring command information) may be transmitted from the radio base station to the user terminal. For example, when monitoring periodicity information to show the monitoring periodicity is transmitted to the user terminal in the broadcast signal, monitoring command information may be transmitted to the user terminal by higher layer signaling or physical layer signaling.

Figure 4:
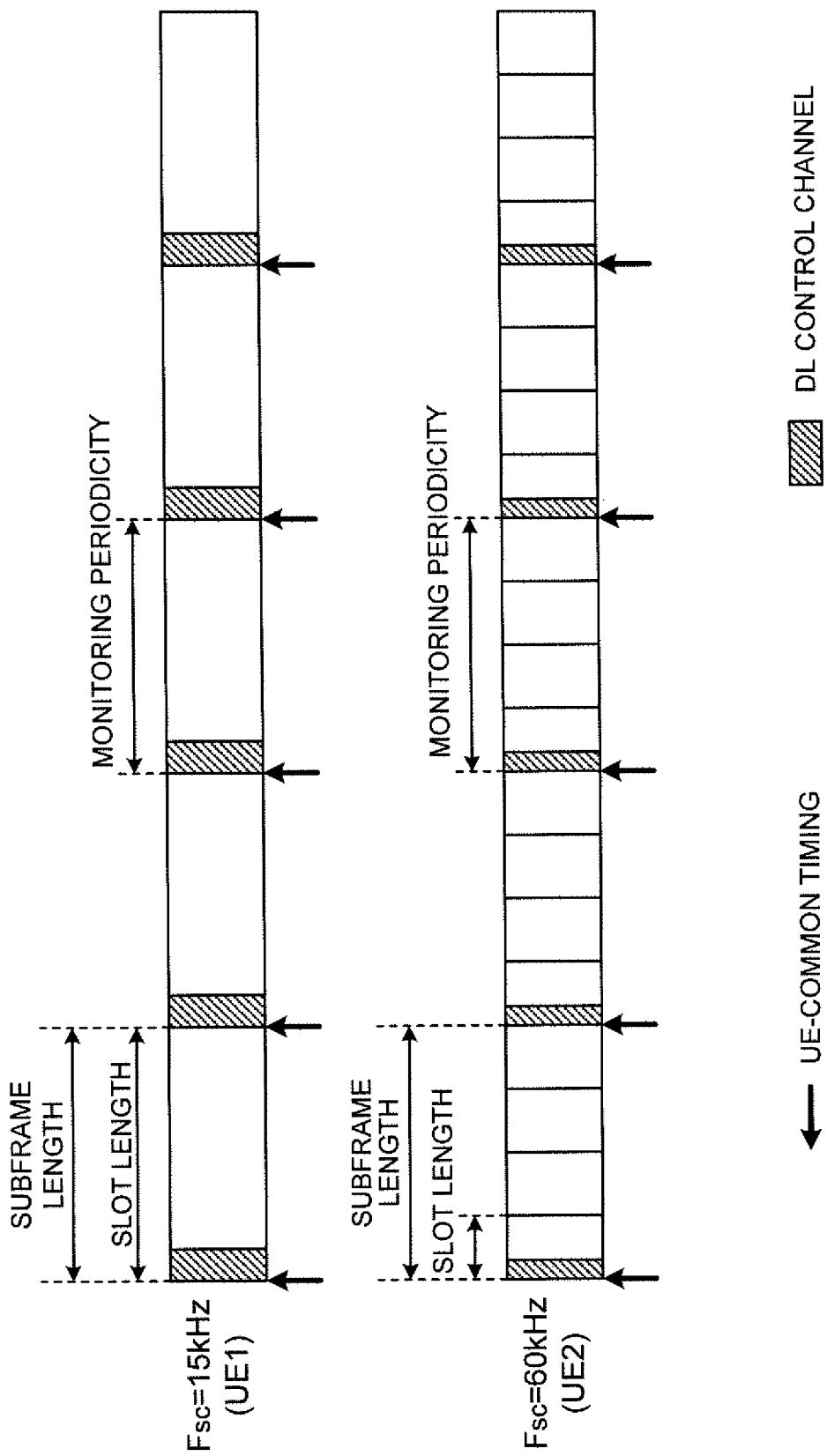
FIG. 4 is a diagram to show examples of DL control channel monitoring operations according to a first example of the present invention.

FIG. 4 is a diagram to show examples of DL control channel monitoring operations according to the first example. FIG. 4 shows examples of operations of user terminal 1 at a subcarrier spacing of 15 kHz and user terminal 2 at a subcarrier spacing of 60 kHz. Also assume that user terminals 1 and 2 can be multiplexed in the same carrier (CC, cell, etc.).

For example, referring to FIG. 4, assuming that the subcarrier spacing in the reference numerology is 15 kHz, the length of a subframe may be defined by a predetermined number (X) of symbols of the reference numerology (for example, X=14). Meanwhile, the length of a slot may be defined by a predetermined number (Y) of symbols of the numerology (for example, Y=14) used by each user terminal. In FIG. 4, Y has the same value between the subcarrier spacings of 15 kHz and 60 kHz, so that the slot length when the subcarrier spacing is 60 kHz is ¼ (or approximately ¼) of the slot length when the subcarrier spacing is 15 kHz.

In FIG. 4, user terminals 1 and 2 monitor DL control channels (blind-decode prospective DL control channels) in the monitoring periodicity specified by the monitoring periodicity information. The monitoring periodicity in FIG. 4 may be indicated by using at least one of the number of slots in the reference numerology (for example, one in FIG. 4), absolute time (for example, 1 ms), the number of subframes, and the length of a subframe.

FIG. 4 assumes that the scheduling unit for user terminal 1 that operates at the subcarrier spacing of 15 kHz is one slot, and the scheduling unit for user terminal 2 that operates at the subcarrier spacing of 60 kHz is four slots. In this case, the scheduling unit of DL/UL data channels is the same between user terminals 1 and 2 that use different subcarrier spacings, so that the processing load on the scheduler in the radio base station can be reduced.

Meanwhile, even if, in FIG. 4, user terminal 2 has higher capabilities (for example, higher processing capabilities) than user terminal 1, user terminal 2 can schedule DL/UL data channels based only on the same scheduling unit as that of user terminal 1. Therefore, user terminal 2 may not be able to benefit from reduced latency and the like sufficiently.

Figure 5:
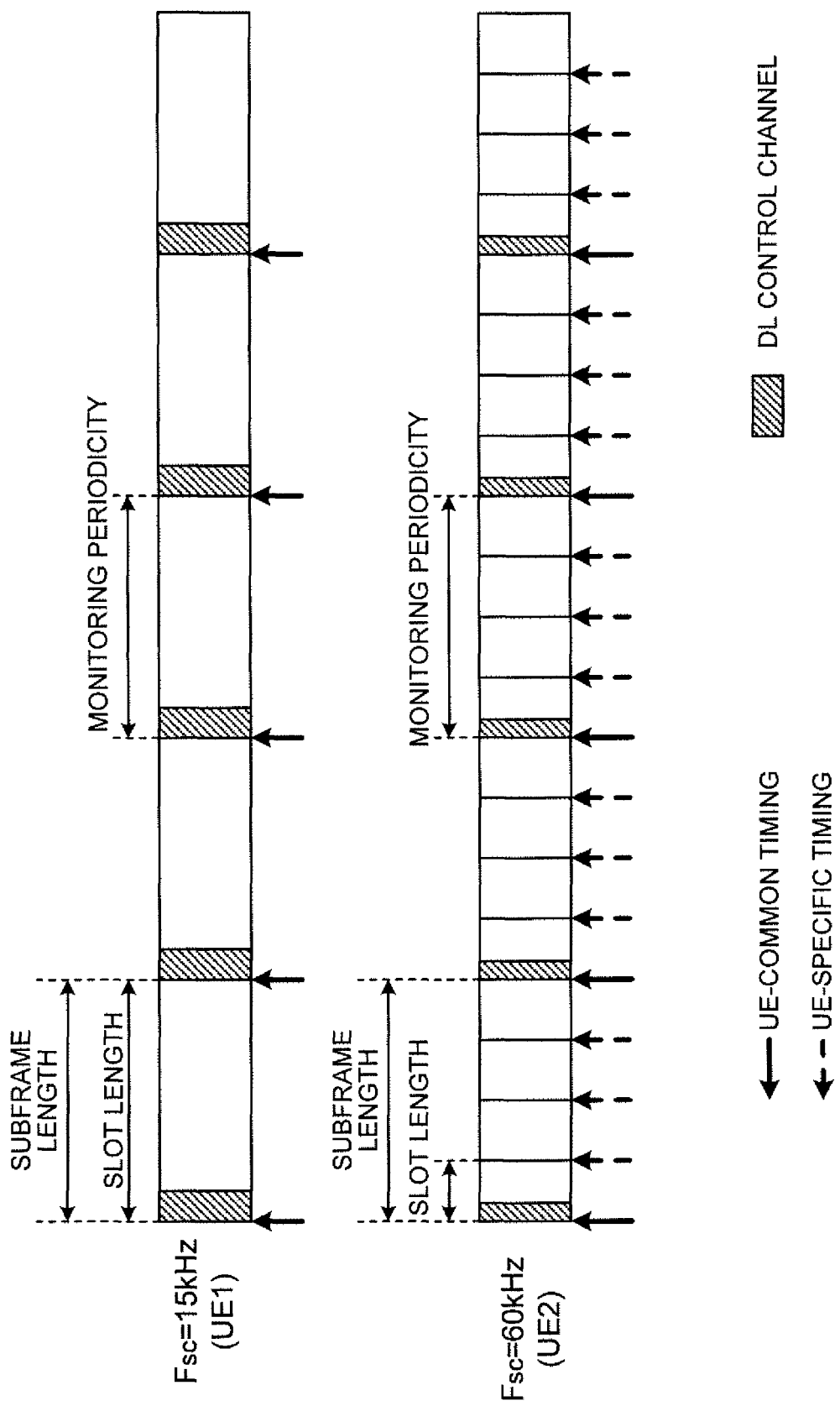
FIG. 5 is a diagram to show other examples of DL control channel monitoring operations according to the first example.

Therefore, user terminal 2 may be commanded, by monitoring command information, to monitor DL control channels outside the monitoring periodicity. FIG. 5 is a diagram to show other examples of DL control channel monitoring operations according to the first example. In FIG. 5, similar to FIG. 4, user terminal 1 that operates at the subcarrier spacing of 15 kHz and user terminal 2 that operates at the subcarrier spacing of 60 kHz are multiplexed in the same carrier. Referring to FIG. 5, differences from FIG. 4 will be primarily described below.

In FIG. 5, user terminal 2 monitors a DL control channel in the monitoring periodicity (user terminal-common timings) that is specified by monitoring periodicity information, and monitors the DL control channel at timings (user terminal-specific timings) that are specified by monitoring command information. For example, referring to FIG. 5, the monitoring periodicity is comprised of four slots, and user terminal 2 monitors the DL control channel in the three slots other than the first slot as well.

In FIG. 5, user terminal 2 may make the monitoring (blind decoding) operation at user terminal-common timings and the monitoring (blind decoding) operation at user terminal-specific timings different.

To be more specific, at least one of the number of prospective DL control channels (prospective resources) forming a search space (the number of times of blind decoding), the DCI format to search, the aggregation level (AL) to search, and the number of prospective resources per AL (number of times of blind decoding) may be different between user terminal-common timings and user terminal-specific timings. For example, user terminal 2 may detect user terminal-common DCI at user terminal-common timings, and detect user terminal-specific DCI at user terminal-specific timings.

Note that, in FIG. 5, monitoring command information commands blind decoding at user terminal-specific timings outside the monitoring periodicity specified by monitoring periodicity information, but this is by no means limiting. A monitoring periodicity equal to the slot length where the subcarrier spacing is 60 kHz may be configured for user terminal 2.

In this way, according to the first example, the period for monitoring DL control channels is reported from a radio base station to a user terminal. Consequently, even when the unit of scheduling is subject to control, the user terminal can properly detect DCI that schedules DL/UL data channels in this scheduling unit based on the monitoring periodicity reported from the radio base station. Therefore, it is possible to reduce processing load and power consumption in the user terminal.

Second Example

According to a second example of the present invention, a user terminal may report information to show the feedback delay time and/or the UL data delay time (delay time information), to the network (for example, radio base station), as this user terminal's capability information (UE capability).

Here, the feedback delay time refers to the minimum time it takes, after a DL data channel is received, to transmit retransmission control information in response to the DL data channel (first delay time). In addition, the UL data delay time refers to the minimum time it takes, after a UL grant is received, to transmit the UL data channel that is scheduled by the UL grant (second delay time). The delay time information may represent the above feedback delay time and UL data delay time separately. Alternatively, the delay time information may show a common value as the above feedback delay time and UL data delay time. The delay time information may represent the feedback delay time and the UL data delay time by using one of the number of slots, absolute time and the number of subframes.

The radio base station may transmit information (transmission timing information) that represents the time interval for use for controlling the timing for transmitting retransmission control information in response to the DL data channel (also referred to as the "first time interval," "DL data-UL control period," "k," etc.), and/or the time interval for use for controlling the timing for transmitting the UL data channel (also referred to as the "second time interval," "DL control-UL data period," "k," etc.), to each user terminal, based on the delay time information reported from each user terminal.

According to the second example, when a DL data channel is received, a user terminal may transmit retransmission control information in response to the DL data channel after the first time interval passes, which is indicated by the transmission timing information. Also, when a UL grant is received, the user terminal may transmit the UL data channel scheduled by this UL grant after the second time interval passes, which is indicated by the transmission timing information.

Here, the first and second time intervals may be the same value or different values. In the event of FDD (Frequency Division Duplex), the first time interval may be equal to the feedback delay time, and, in the event of TDD (Time Division Duplex), the first time interval may assume a value that is determined based on the feedback delay time and the UL/DL configuration. Similarly, in the event of FDD, the second time interval may be equal to the UL data delay time, and, in the event of TDD, the second time interval may assume a value that is determined based on the UL data delay time and the UL/DL configuration.

The above transmission timing information may represent the first and/or second time intervals by using one of the number of slots, absolute time and the number of subframes, which have been mentioned earlier. Also, the above transmission timing information may be signaled in a user terminal-specific manner. For example, user terminal-specific transmission timing information may be transmitted in higher layer signaling (for example, RRC signaling and/or MAC signaling) and/or physical layer signaling (for example, DCI).

Alternatively, the above transmission timing information may be signaled to one or more user terminals in common. One or more user terminals in this case may be all the user terminals in the same carrier (cell) or one or more user terminals that are grouped. For example, transmission timing information that is that is common to one or more user terminals may be transmitted by using at least one of broadcast signals, higher layer signaling and physical layer signaling.

Figure 6A:
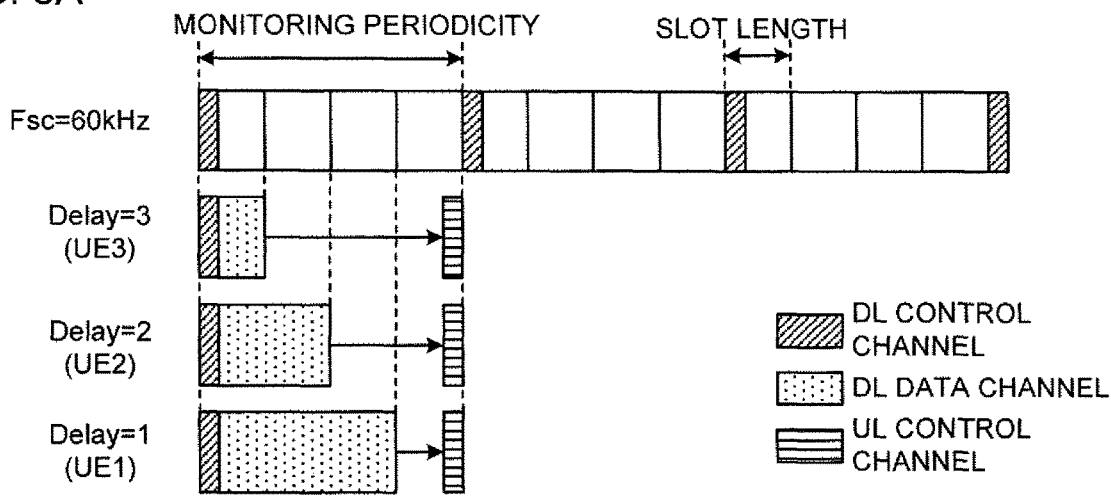
FIGS. 6A to 6C are diagrams to show examples of controlling the timing for transmitting retransmission control information according to a second example of the present invention.
Figure 6B:
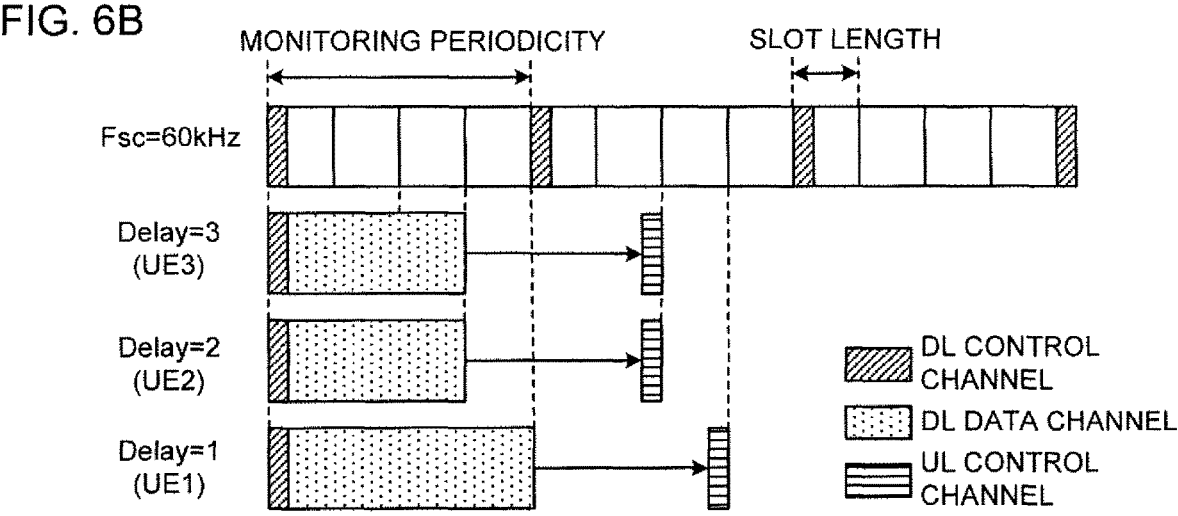
Figure 6C:
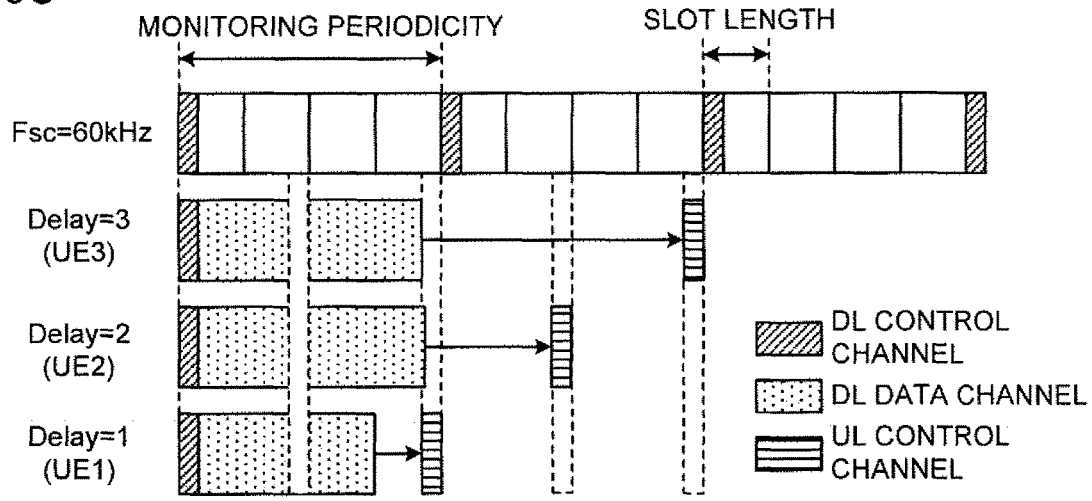

FIG. 6 are diagrams to show examples of controlling the timing for transmitting retransmission control information according to the second example. FIGS. 6A to 6C show cases where user terminals 1 to 3, which use the subcarrier spacing 60 kHz, control the timing for transmitting retransmission control information in response to DL data channels.

Note that, in FIGS. 6A to 6C, the first time interval (DL data-UL control period, or k), shown by transmission timing information from the radio base station, is one slot for user terminal 1, two slots for user terminal 2, and three slots in user terminal 3.

Also, although FIGS. 6A to 6C assume that the monitoring periodicity for user terminals 1 to 3 is configured with four slots (1 ms) at a subcarrier spacing of 60 kHz, this is by no means limiting. Furthermore, FIGS. 6A to 6C assume that user terminals 1 to 3 monitor DL control channels in the monitoring periodicity, but user terminals 1 to 3 may monitor DL control channels at shorter timings than the monitoring periodicity (for example, every predetermined number of slots).

FIG. 6A shows an example in which user terminals 1 to 3 control the timing for transmitting retransmission control information based on user terminal-specific transmission timing information. For example, in FIG. 6A, user terminals 1, 2 and 3 each monitor a DL control channel in the first slot of the monitoring periodicity, and detect DCI addressed to each user terminal. In FIG. 6A, user terminals 1, 2 and 3 receive DL data channels in one slot, two slots and three slots, respectively, based on the DCI detected.

In FIG. 6A, user terminals 1, 2 and 3 receive user terminal-specific transmission timing information to show that the first time interval (DL data-UL control period, or k) is one slot, two slots and three slots, respectively. Based on this user terminal-specific transmission timing information, user terminal 1 transmits retransmission control information in response to the DL data channel in the UL control channel that is located one slot after the last slot n in which the DL data channel was received. Likewise, user terminals 2 and 3 each transmit retransmission control information in response to the DL data channel in the UL control channel that is located two slots or three slots after the last slot n in which the DL data channel was received, based on the transmission timing information.

FIG. 6B shows an example in which user terminals 1 to 3 control the timing for transmitting retransmission control information based on transmission timing information that is common among the user terminals. In FIG. 6B, similar to FIG. 6A, user terminals 1, 2 and 3 each receive a DL data channel over three slots or four slots, based on DCI that is detected.

In FIG. 6B, user terminals 1, 2 and 3 each receive common transmission timing information that shows that the first time interval (DL data-UL control period, or k) is three slots. Based on this common transmission timing information, user terminals 1, 2 and 3 each transmit retransmission control information in response to a DL data channel in the UL control channel that is located three slots after the last slot n in which the DL data channel was received.

As shown in FIG. 6B, the timing for transmitting retransmission control information in response to the DL data channels addressed to user terminals 1 to 3 may cross the monitoring periodicity.

Referring to FIG. 6C, predetermined symbols are reserved for UL control channels at shorter time intervals than the monitoring periodicity. For example, in FIG. 6C, for every two slots, a predetermined number of symbols at the end of a slot are reserved for a UL control channel. User terminals 1 to 3 each transmit retransmission control information in response to a DL data channel, by using a UL control channel, at the earliest timing a predetermined number of slots or more after the last slot n in which the DL data channel was received, which is indicated by user terminal-specific transmission timing information.

For example, in FIG. 6C, user terminals 1 and 2 each transmit retransmission control information in response to a DL data channel by using symbols that are reserved for a UL control channel one slot or two slots after the last slot n in which the DL data channel was received. Meanwhile, as for user terminal 3, no symbol for a UL control channel is reserved three slots after the last slot n in which the DL data channel was received, and so user terminal 3 uses the symbol reserved for a UL control channel four slots later, to transmit retransmission control information in response to the DL data channel.

Note that, although, in FIG. 6C, retransmission control information is transmitted at the earliest timing a predetermined number of slots or more later, which is indicated by user terminal-specific transmission timing information, as has been described with reference to FIG. 6B, this retransmission control information may be transmitted at the earliest timing a predetermined number of slots or more later, which is shown by transmission timing information that is common among the user terminals.

Figure 7A:
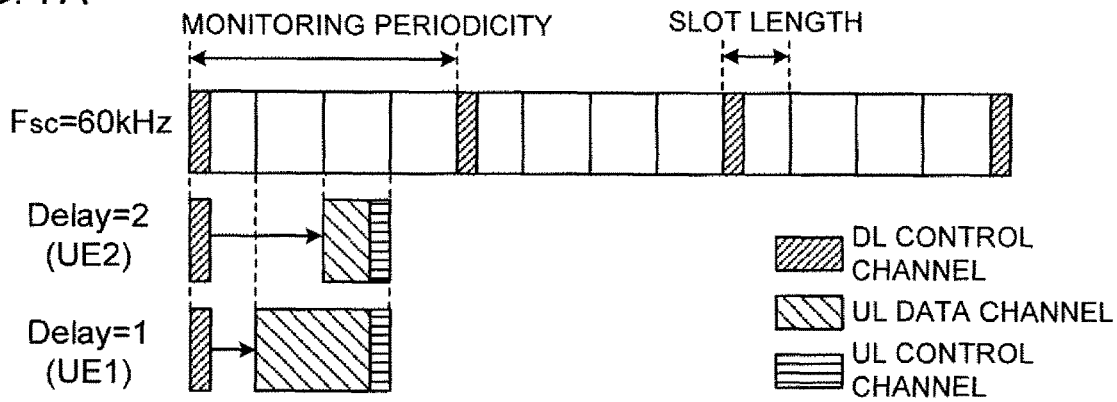
FIGS. 7A to 7C are diagrams to show examples of controlling the timing for transmitting UL data channels according to the second example.
Figure 7B:
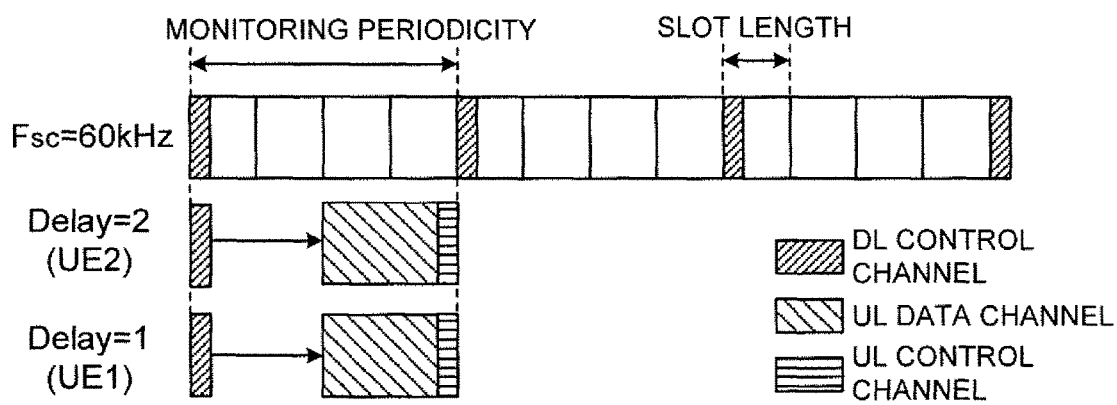
Figure 7C:
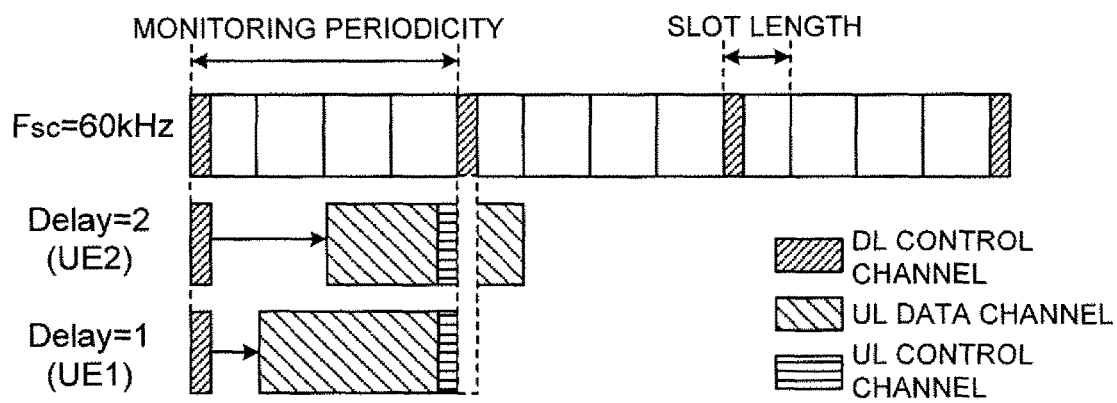

FIG. 7 are diagrams to show examples of controlling the timing for transmitting UL data channels according to the second example. Now, with reference to FIGS. 7A to 7C, examples will be described below, in which user terminals 1 to 3 to use a subcarrier spacing of 60 kHz control the timing for transmitting UL data channels that are scheduled by UL grants.

Note that, in FIGS. 7A to 7C, the second time interval (DL control-UL data period, or k) shown by transmission timing information from the radio base station is one slot for user terminal 1 and two slots for user terminal 2. Differences from FIG. 6 will be primarily described below.

Referring to FIG. 7A, an example will be described below in which user terminals 1 and 2 control the timing for transmitting UL data channels based on user terminal-specific transmission timing information. For example, in FIG. 7A, user terminals 1 and 2 each monitor a DL control channel in the first slot of the monitoring periodicity, and detect DCI (UL grant) for each user terminal. In FIG. 7A, user terminals 1, 2 and 3 each transmit a UL data channel based on the UL grant detected.

In FIG. 7A, user terminals 1 and 2 each receive user terminal-specific transmission timing information that shows that the second time interval (DL control-UL data period, or k) is one slot or two slots. Based on the user terminal-specific transmission timing information, user terminals 1 and 2 each transmit a UL data channel one slot or two slots after the slot n in which the UL grant was received.

FIG. 7B shows an example in which user terminals 1 and 2 control the timing for transmitting UL data channels based on transmission timing information that is common between the user terminals. In FIG. 7B, user terminals 1 and 2 each receive common transmission timing information that shows that the second time interval (DL control-UL data period, or k) is two slots. Based on this common transmission timing information, user terminals 1 and 2 each transmit a UL data channel two slots after the slot n in which the UL grant was received.

FIG. 7C shows an example in which a UL data channel is scheduled over the monitoring periodicity. When a UL grant is received in a slot n, a user terminal starts transmitting the UL data channel scheduled by this UL grant a predetermined number of slots after the slot n, which is indicated by user terminal-specific transmission timing information.

As shown in FIG. 7C, a UL data channel that is scheduled by a UL grant may cross the DL control channel monitoring timing (for example, the UL data channel for user terminal 2), or may not cross the DL control channel monitoring timing (for example, the UL data channel for user terminal 1). In FIG. 7, user terminal 2 may stop the UL data channel transmission process at the DL control channel monitoring timing, and blind-decode the DL control channel.

According to the second example, first and/or second time intervals (DL data-UL control period and/or DL control-UL data period) are determined based on delay time information from a user terminal, and reported from a radio base station to the user terminal, so that it is possible to transmit retransmission control information and/or UL data channels at transmission timings that suit the user terminal's processing capabilities.

Third Example

According to a third example of the present invention, DCI that is transmitted in the monitoring periodicity may include information to show the presence/absence and/or the locations (allocation information) of a DL control channel and/or a UL control channel (hereinafter referred to as "DL/UL control channels") at timings apart from the monitoring periodicity.

DCI to contain this allocation information may be DCI that is common to user terminals (hereinafter referred to as "common DCI") in a cell (that is, "cell-specific"), DCI that is common to one or more user terminals that are to grouped (hereinafter referred to as "group DCI"), or user terminal-specific DCI (hereinafter referred to as "dedicated DCI"). CRC that is scrambled (masked) based on cell-specific information may be appended to common DCI. Also, to group DCI, CRC scrambled based on information that is common in the group may be appended. To dedicated DCI, CRC scrambled based on user terminal-specific is information (for example, C-RNTIs (Cell-Radio Network Temporary Identifiers), user terminal IDs, etc.) may be appended.

Also, with this allocation information, the presence/absence and/or the locations of DL/UL control channels at timings apart from the monitoring periodicity may be indicated per resource in the time direction (for example, per symbol), or may be indicated per resource in the time and frequency directions (for example, per resource element (RE) that is constituted by one subcarrier and one symbol, or per RE group (REG) that is constituted by a plurality of REs).

A user terminal may control transmission and/or receipt of DL/UL data channels based on this allocation information. To be more specific, based on the presence/absence and/or the locations of DL/UL control channels indicated by the allocation information, the user terminal may apply rate matching to the DL/UL data channels per resource in the time and/or frequency directions (for example, per symbol, RE, REG and so forth).

Figure 8A:
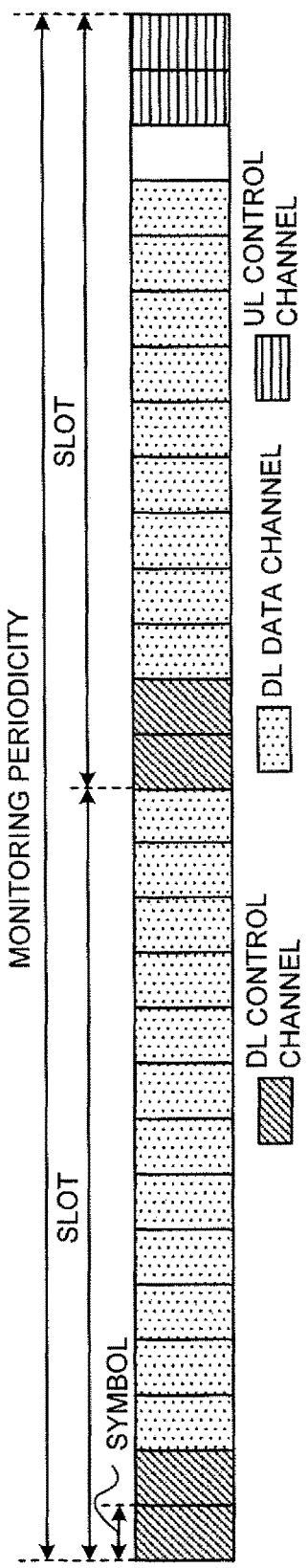
FIGS. 8A to 8C are diagrams to show examples of allocation of DL/UL control channels according to a third example of the present invention.
Figure 8B:
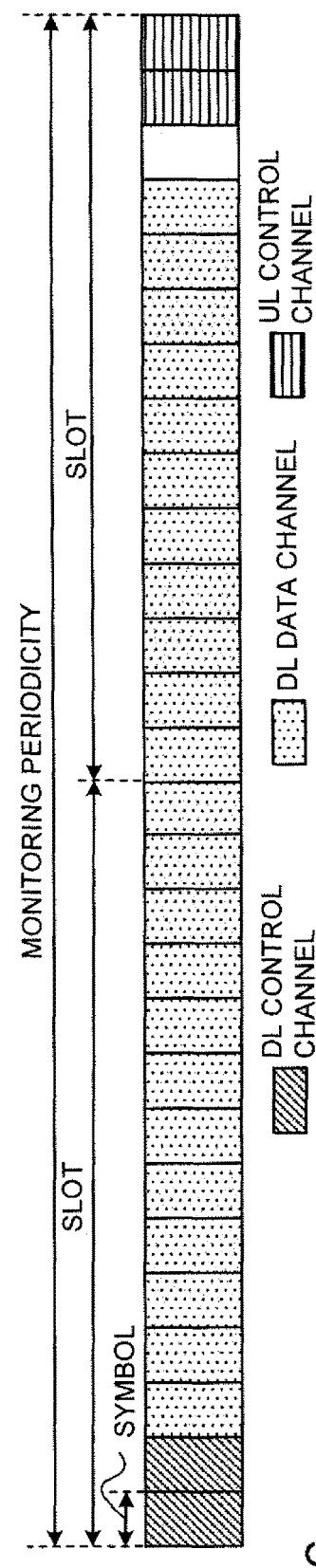
Figure 8C:
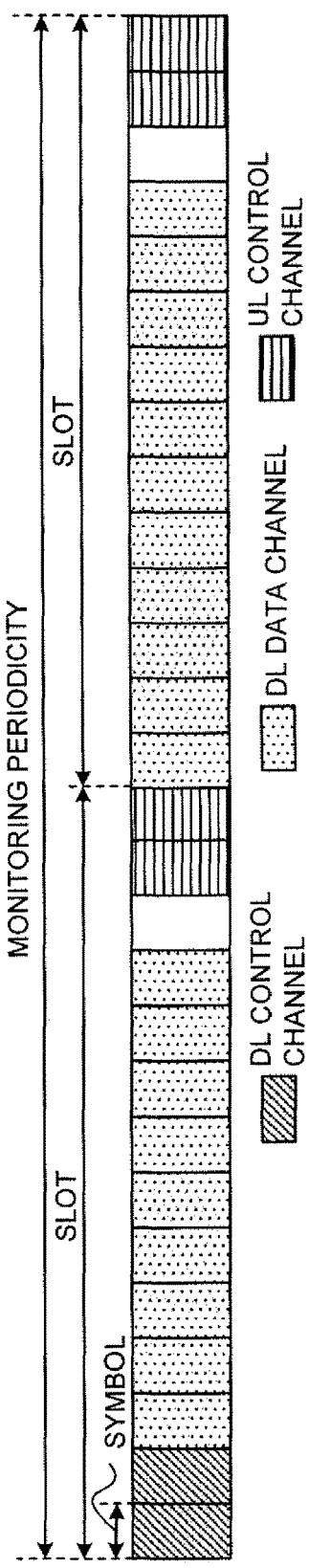

FIG. 8 provide diagrams to show examples of allocation of DL/UL control channels according to the third example. FIGS. 8A to 8C show examples in which the monitoring periodicity is comprised of two slots, but the number of slots to constitute the monitoring periodicity is not limited to two.

Also, FIGS. 8A to 8C show examples in which the above allocation information shows the presence/absence and/or the locations of DL/UL control channels in symbol units. FIGS. 8A to 8C assume that a predetermined number of symbols (for example, two symbols) at the end of the monitoring periodicity are reserved for UL control channels, but this is by no means limiting.

For example, in the event of FIG. 8A, the user terminal performs blind-decoding in the monitoring periodicity and detects DCI (for example, at least one of the above-mentioned common DCI, group DCI and dedicated DCI), and, from the allocation information contained in this DCI, learns that a DL control channel is allocated to the first two symbols of the second slot in the monitoring periodicity. The user terminal assumes that a DL data channel is not mapped in these first two symbols of the second slot, and performs receiving processes for the DL data channel (for example, at least one of demodulation, rate matching and decoding).

In the event of FIG. 8B, the user terminal learns, from the allocation information contained in DCI that is detected in the monitoring periodicity, that a DL control channel is not allocated to the first two symbols of the second slot in the monitoring periodicity. The user terminal assumes that a DL data channel is mapped to these first two symbols of the second slot and performs receiving processes for the DL data channel.

In the event of FIG. 8C, the user terminal learns, from the allocation information contained in DCI that is detected in the monitoring periodicity, that a UL control channel is allocated to the last two symbols of the first slot in the monitoring periodicity. Also, the user terminal learns that one symbol for switching from the DL to the UL is provided between the DL data channel and the UL control channel in the first slot. The user terminal assumes that the DL data channel is not mapped to the last three symbols of the first slot and performs receiving processes for the DL data channel.

Figure 9:
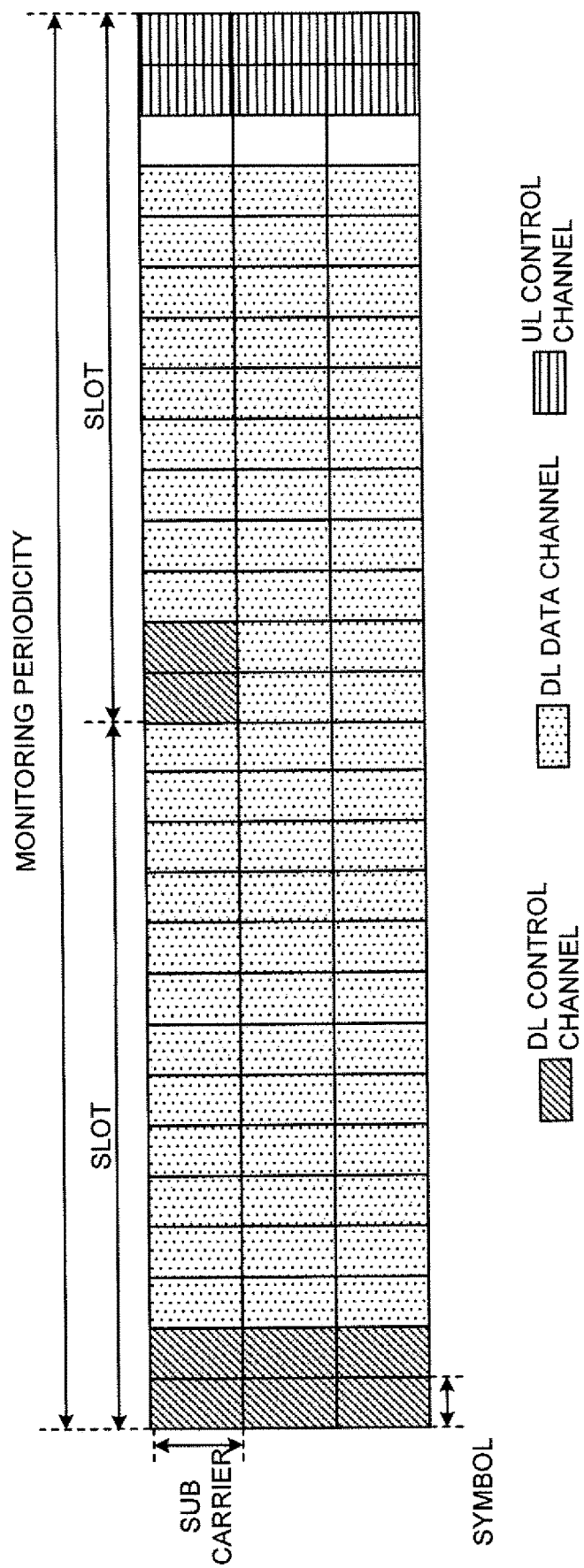
FIG. 9 is a diagram to show another example of allocation of DL/UL control channels according to the third example.

FIG. 9 is a diagram to show another example of allocation of DL/UL control channels according to the third example. FIG. 9 shows an example in which the above-described allocation information shows the presence/absence and/or the locations of DL/UL control channels in RE units.

For example, in FIG. 9, the user terminal performs blind decoding in the monitoring periodicity and detects DCI (for example, at least one of the above-mentioned common DCI, group DCI and dedicated DCI), and, from the allocation information contained in this DCI, learns that a DL control channel is allocated to predetermined carrier of the first two symbols of the second slot in the monitoring periodicity. The user assumes that a DL data channel is not mapped to these first two symbols of the second slot, and performs receiving processes for the DL data channel (for example, at least one of demodulation, rate matching and decoding).

According to the third example, the user terminal may identify the presence/absence and/or the locations of DL/UL control channels based on information other than the allocation information described above. For example, resources where DL/UL control channels are allocated may be reported from the radio base station to the user terminal as blank resources. Information to represent these blank resources (blank resource information) may be included in the common DCI, group DCI or dedicated DCI, which have been described above.

Also, in the monitoring periodicity, the user terminal may receive DCI that contains information to request blind decoding (decoding request information) in predetermined resources (for example, symbol units and/or frequency resource units in symbols), and perform blind decoding in these predetermined resources based on the decoding request information.

In the monitoring periodicity, the user terminal may receive DCI that contains request information to request transmission of predetermined information (transmission request information) using UL control channels in predetermined resources (for example, symbol units and/or frequency resource units in symbols), and transmit the predetermined information in the predetermined resources based on the transmission request information.

Note that the decoding request information and/or the transmission request information above may be included in the common DCI, group DCI or dedicated DCI, which have been described above.

According to the third example, the presence/absence and/or the locations of DL/UL control channels at timings apart from the monitoring periodicity are reported from a radio base station to user terminals, so that unnecessary overhead can be reduced when a plurality of slots constitute the unit of scheduling.

(Radio Communication System)

Now, the structure of a radio communication system according to the present embodiment will be described below. In this radio communication system, the radio communication methods according to the above-described examples are employed. Note that the radio communication methods according to the herein-contained examples of the present invention may be applied individually, or may be applied in combinations.

Figure 10:
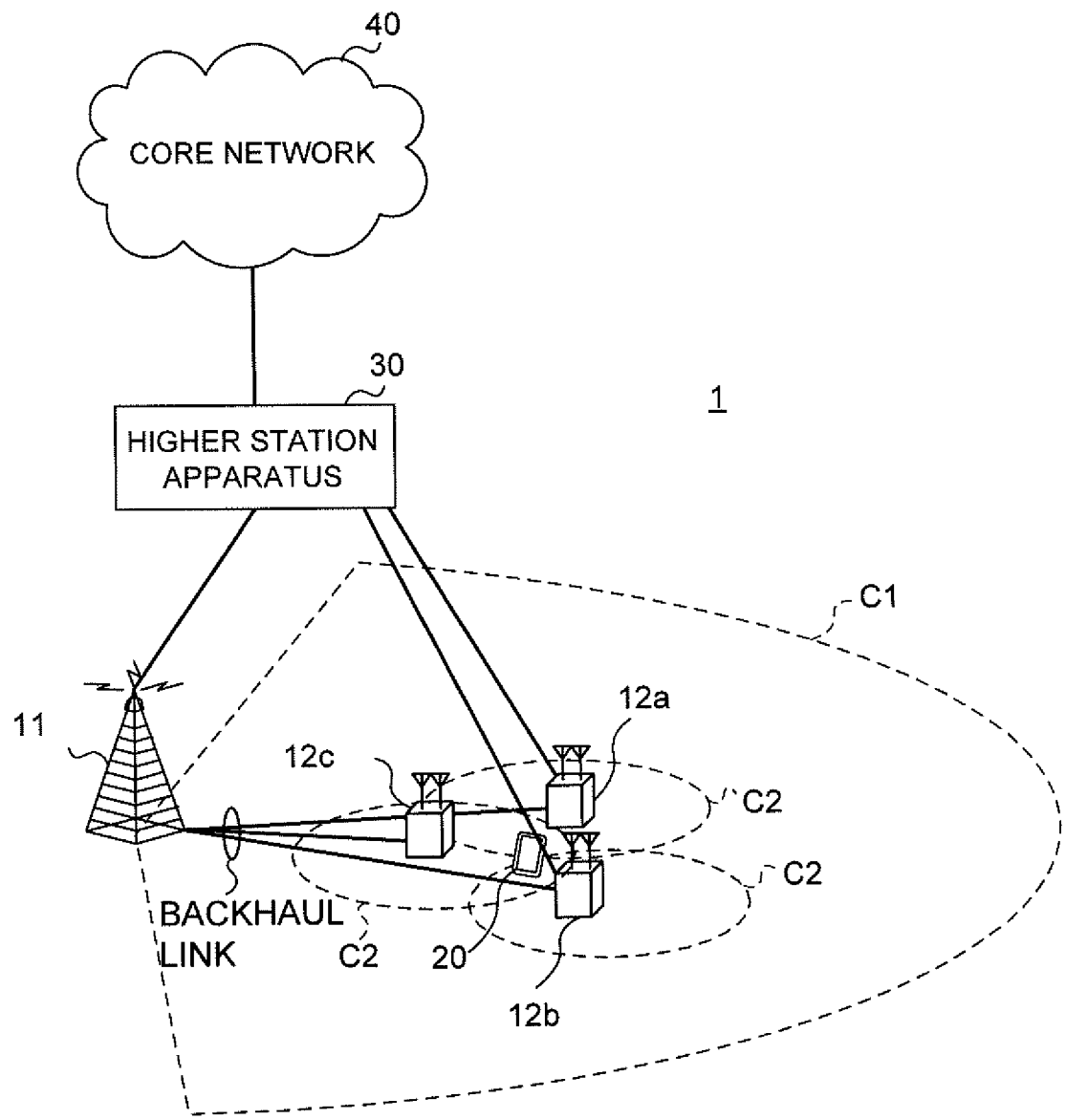
FIG. 10 is a diagram to show an example of a schematic structure of a radio communication system according to the present embodiment.

FIG. 10 is a diagram to show an exemplary schematic structure of a radio communication system according to an embodiment of the present invention. A radio communication system 1 can adopt carrier aggregation (CA), which aggregates a plurality of fundamental frequency blocks (component carriers (CCs)) into one, where a LTE system bandwidth (for example, 20 MHz) constitutes one unit, and/or adopt dual connectivity (DC), which uses a plurality of cell groups (CGs) comprised of one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology)") and so on.

The radio communication system 1 shown in FIG. 10 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration to apply different numerologies between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate by using time division duplexing (TDD) or frequency division duplexing (FDD) in each cell. A TDD cell and an FDD cell may be referred to as a "TDD carrier (frame structure type 2)," and an "FDD carrier (frame structure type 1)," respectively.

Furthermore, in each cell (carrier), a single numerology may be employed, or a number of different numerologies may be employed. Here, a numerology refers to a parameter defined in the frequency direction and the time direction, such as at least one of subcarrier spacing, the length of a symbol, the length of a cyclic prefix, and the length of a subframe.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the configurations of the frequency band for use in each radio base station are by no means limited to these.

A structure may be employed here, in which wire connection (for example, optical fiber, which is in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in UL.

In the radio communication system 1, a DL shared channel (PDSCH (Physical Downlink Shared CHannel), which is also referred to as, for example, "DL data channel"), which is shared by each user terminal 20, a broadcast channel (PBCH (Physical Broadcast CHannel)), L1/L2 control channels and/or other channels are used as DL channels. User data, higher layer control information, SIBs (System Information Blocks) and so forth are communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of A/N, NDI, HPN and redundancy version (RV)) for UL signals (for example, PUSCH) can be communicated by using at least one of the PHICH, the PDCCH and the EPDCCH.

In the radio communication system 1, a UL shared channel (PUSCH (Physical Uplink Shared CHannel), which is also referred to as a "UL data channel" and so on), which is shared by each user terminal 20, a UL control channel (PDCCH (Physical Uplink Control CHannel)), a random access channel (PRACH (Physical Random Access CHannel)) and so on are used as UL channels. User data, higher layer control information and so on are communicated by the PUSCH. Uplink control information (UCI) to include at least one of retransmission control information (for example, A/N), channel state information (CSI), and a scheduling request (SR), pertaining to DL signals (for example, PDSCH), is communicated in the PUSCH or the PUCCH. By means of the PRACH, random access preambles for establishing connections with cells are communicated.

(Radio Base Station)

Figure 11:
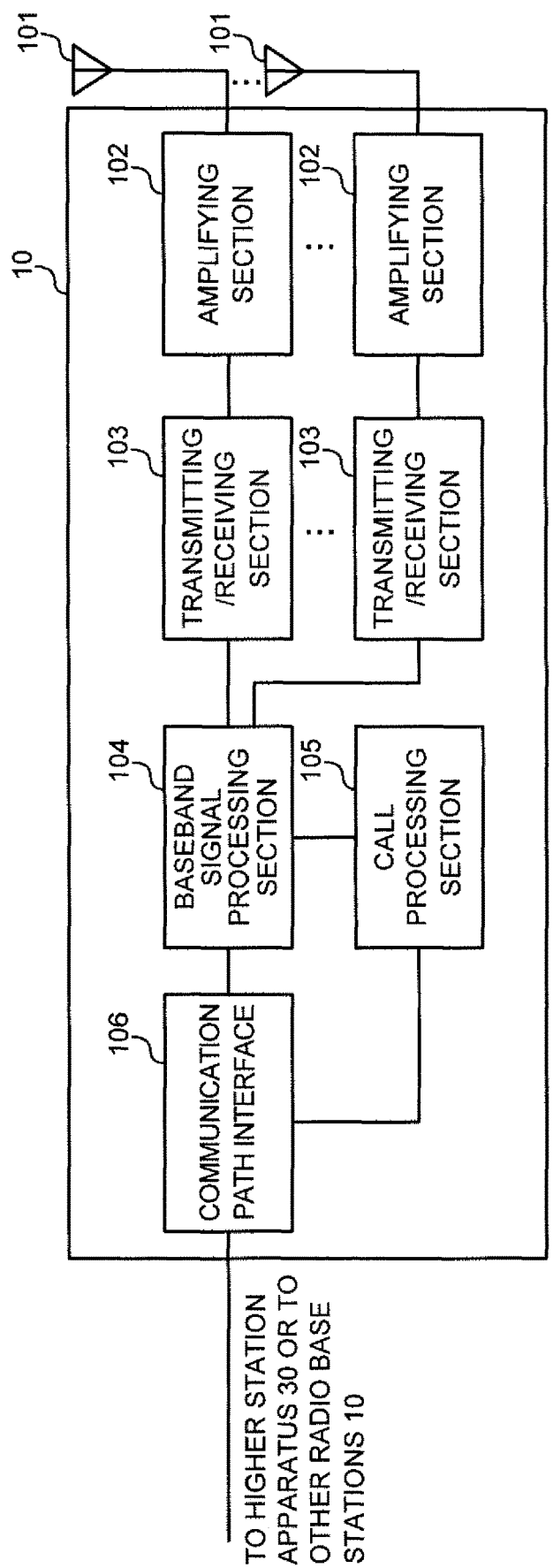
FIG. 11 is a diagram to show an example of an overall structure of a radio base station according to the present embodiment.

FIG. 11 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including, for example, at least one of a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to the transmitting/receiving sections 103. Furthermore, downlink control signals are also subjected to transmission processes such as channel coding and/or an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing of communication channels, manages the state of the radio base station 10 and manages radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, optical fiber, which is in compliance with the CPRI (Common Public Radio Interface), the X2 interface, etc.).

In addition, the transmitting/receiving sections 103 transmit DCI (including DL assignments that allocate DL data channels, and/or UL grants that schedule UL data channels) via a DL control channel. The transmitting/receiving sections 103 transmit DL data channels and receive UL data channels.

In addition, the transmitting/receiving sections 103 transmit at least one of monitoring periodicity information (first example), monitoring command information (first example), transmission timing information (second example), allocation information (third example), blank resource information (third example), decoding request information (third example) and transmission request information (third example). Also, the transmitting/receiving sections 203 may receive delay time information (second example).

Figure 12:
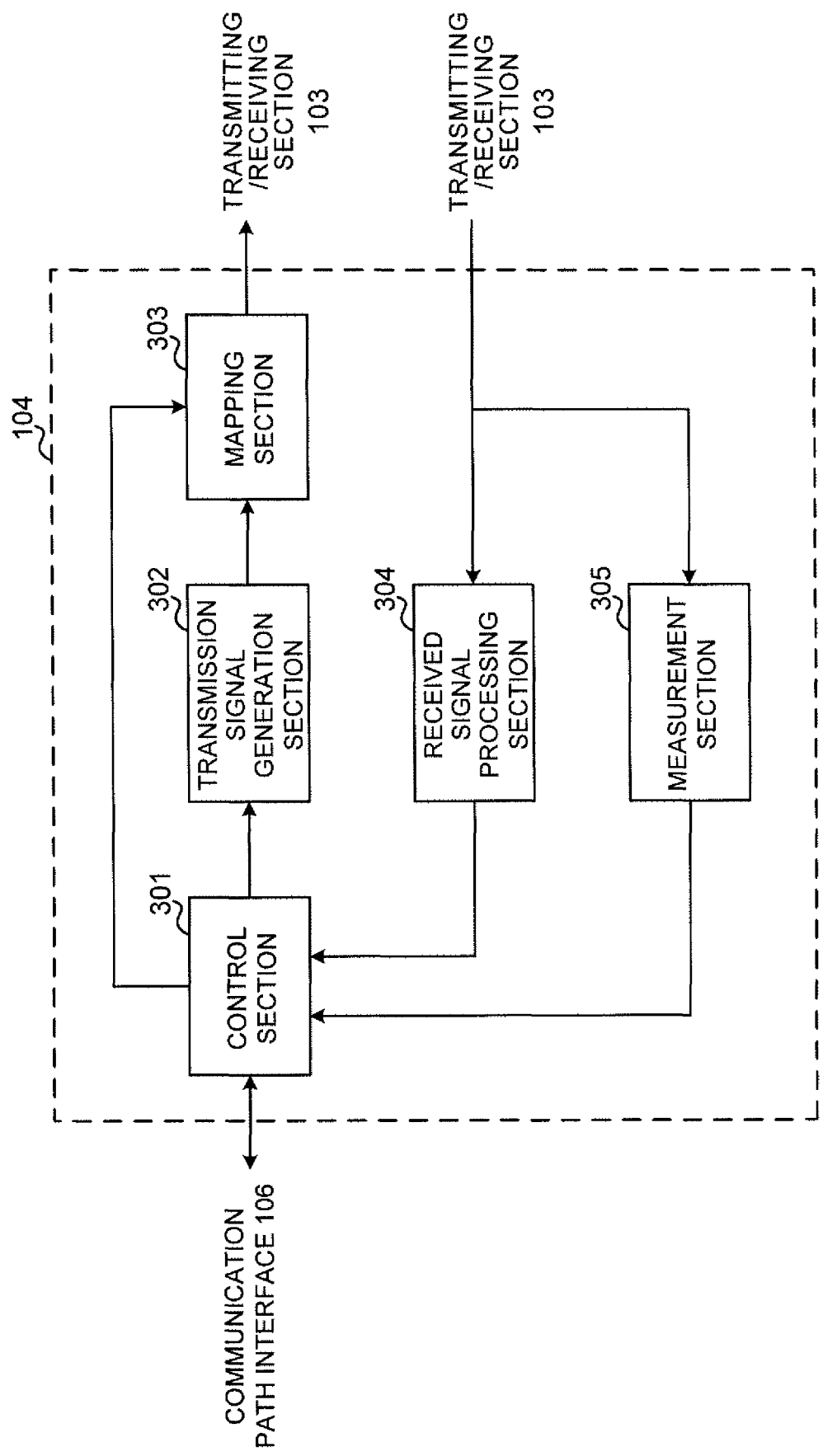
FIG. 12 is a diagram to show an example of a functional structure of a radio base station according to the present embodiment.

FIG. 12 is a diagram to show an exemplary functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 schedules user terminals 20. For example, the control section 301 schedules a DL/UL data channel for a user terminal 20. The unit of DL/UL data channel scheduling may be constituted by one or more slots.

Furthermore, the control section 301 may exert control so that the period for monitoring (the unit for scheduling DL/UL data channels) a DL control channel for a user terminal 20 is controlled, and monitoring periodicity information to show this monitoring periodicity is transmitted (first example).

Furthermore, the control section 301 may exert control so that whether or not to monitor for the DL control channel at timings apart from the monitoring periodicity is decided, and monitoring command information to show this decision is transmitted (first example).

Also, the control section 301 may exert control so that first and/or second time intervals are controlled based on the feedback delay time and/or the UL data delay time in the user terminal 20, and transmission timing information to show these first and/or second time intervals is transmitted (second example).

In addition, the control section 301 may exert control so that the presence/absence and/or the locations of DL control channels and/or UL control channels at timings apart from the monitoring periodicity are decided, and information to show these decisions (for example, at least one of allocation information, blank resource information, decoding request information and transmission request information) is transmitted (third example).

The control section 301 can be constituted by a controller, a control circuit or control apparatus that can be described based on general understanding of the technical field to which the present invention pertains.

Based on commands from the control section 301, the transmission signal generation section 302 generates DL signals (including DL data, DCI, UL data retransmission control information, higher layer control information and so on), and outputs these DL signals to the mapping section 303.

The transmission signal generation section 302 can be constituted by a signal generator, a signal generation circuit or signal generation apparatus that can be described based on general understanding of the technical field to which the present invention pertains.

Based on commands from the control section 301, the mapping section 303 maps the DL signals generated in the transmission signal generation section 302 (for example, DL data, DCI, UL data retransmission control information, higher layer control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) for UL signals (including, for example, UL data, UCI, etc.) that are transmitted from the user terminals 20. To be more specific, the received signal processing section 304 performs UL signal receiving processes based on the numerologies configured in the user terminals 20. To be more specific, the received signal processing section 304 may output the received signals and/or the signals after receiving processes to the measurement section 305. In addition, the received signal processing section 304 performs receiving processes for A/Ns that arrive in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the channel quality of the UL based on, for example, the received power (for example, RSRP (Reference Signal Received Power))

and/or the received quality (for example, RSRQ (Reference Signal Received Quality)) of UL reference signals. The measurement results may be output to the control section 301.

(User Terminal)

Figure 13:
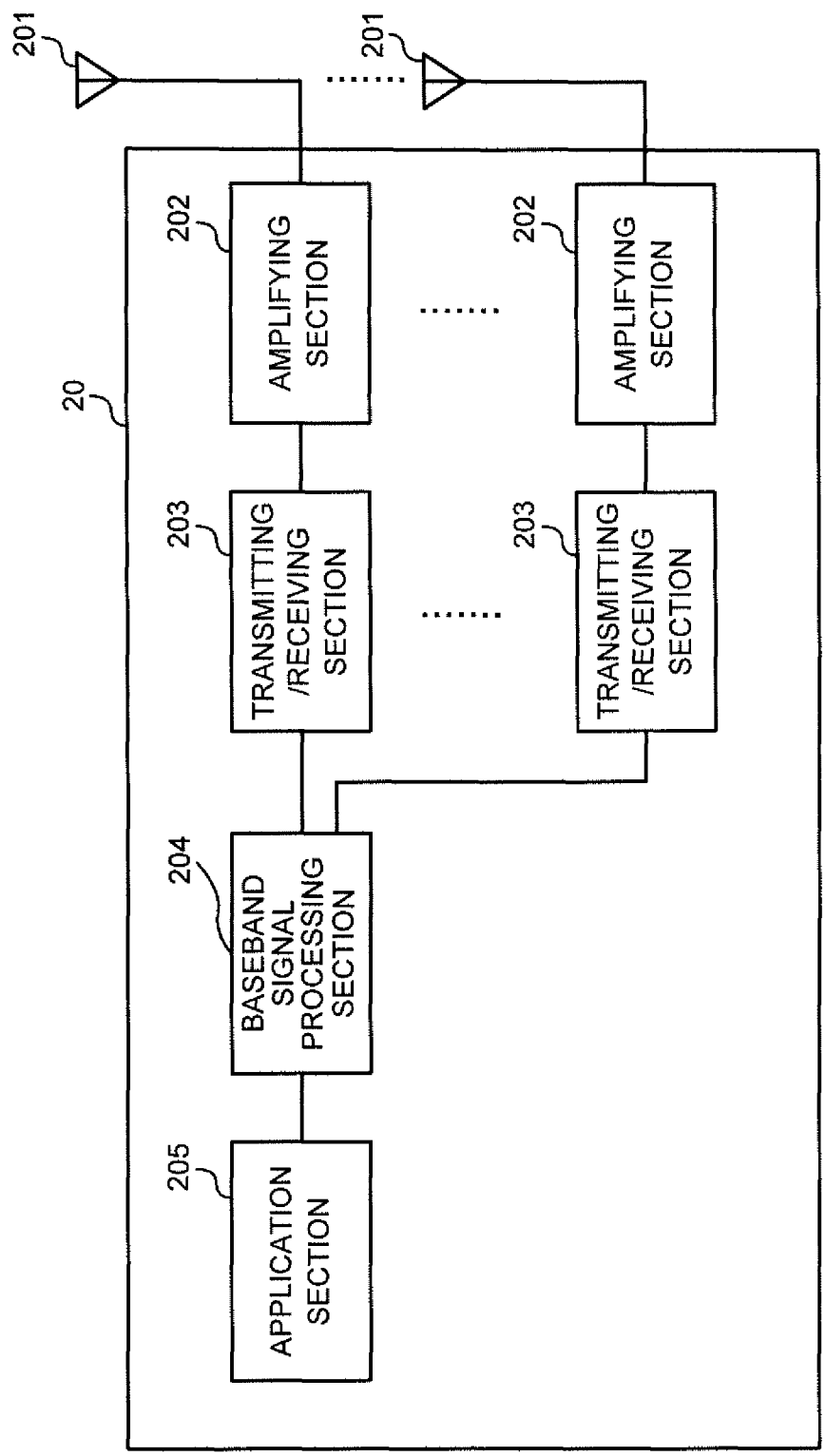
FIG. 13 is a diagram to show an example of an overall structure of a user terminal according to the present embodiment.

FIG. 13 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs receiving processes for the baseband signal that is input, including at least one of an FFT process, error correction decoding, a retransmission control receiving process and so on. DL data is forwarded to the application section 205. The application section 205 performs processes related to higher layers above the physical layer and the MAC layer, and/or other processes. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and SR) is also subjected to channel encoding, rate matching, puncturing, DFT process, IFFT process and so on, and forwarded to each transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DCI (including DL assignments that allocate DL data channels and/or UL grants that schedule UL data channels) via DL control channels. The transmitting/receiving sections 203 receive DL data channels and transmit UL data channels.

In addition, the transmitting/receiving sections 203 receive at least one of monitoring periodicity information (first example), monitoring command information (first example), transmission timing information (second example), allocation information (third example), blank resource information (third example), decoding request information (third example) and transmission request information (third example). Also, the transmitting/receiving sections 203 may transmit delay time information (second example).

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 14:
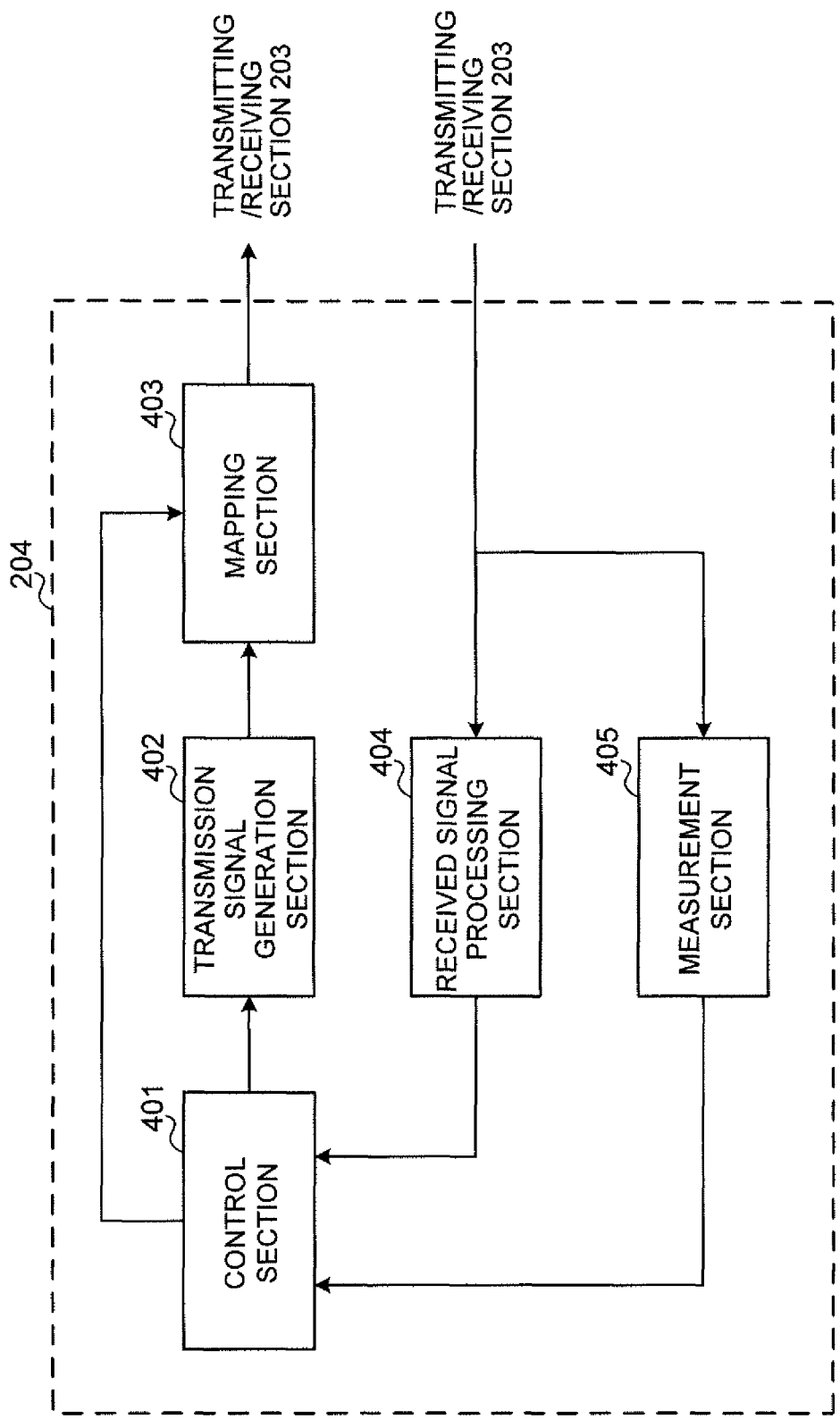
FIG. 14 is a diagram to show an example of a functional structure of a user terminal according to the present embodiment.

FIG. 14 is a diagram to show an exemplary functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal is processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

To be more specific, the control section 401 controls receipt of DL data channels and/or transmission of UL data channels based on DCI from the radio base station 10. This DCI may schedule one or more slots of DL/UL data channels.

The control section 401 also controls monitoring of DL control channels for user terminals 20 based on monitoring periodicity information from the radio base station 10 (first example). In addition, the control section 401 may control the monitoring of DL control channels for user terminals 20 based on monitoring command information from the radio base station 10 (first example).

Furthermore, the control section 401 may control the timing for transmitting retransmission control information for DL data channels and/or UL data channels based on the first and/or second time intervals shown by transmission timing information from the radio base station 10 (second example).

Also, the control section 401 may control receipt of DL data channels and/or transmission of UL data channels based on at least one of allocation information blank resource information, decoding request information, and transmission request information from the radio base station 10 (third example).

The control section 401 can be constituted by a controller, a control circuit or control apparatus that can be described based on general understanding of the technical field to which the present invention pertains.

In the transmission signal generation section 402, UL signals (including UL data, UCI, UL reference signals, etc.) are generated (which includes, for example, encoding, rate matching, puncturing, modulation, etc.) based on commands from the control section 401, and output to the mapping section 403. The transmission signal generation section 402 can be constituted by a signal generator, a signal generation circuit or signal generation apparatus that can be described based on general understanding of the technical field to which the present invention pertains.

The mapping section 403 maps the UL signals generated in the transmission signal generation section 402 to predetermined radio resources, as commanded by the control section 301, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, rate matching, etc.) for DL signals (DL data, DCI, higher layer control information, etc.). The received signal processing section 404 outputs the information received from the radio base station 10, to the control section 401. The received signal processing section 404 outputs, for example, broadcast information, system information, higher layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiment show blocks in functional units. These functional blocks (components) may be implemented in arbitrary combinations of hardware and/or software. Also, means for implementing each functional block is not particularly limited. That is, each functional block may be realized by one piece of apparatus that is physically and/or logically aggregated, or may be realized by connecting two or more physically and/or logically separate pieces of apparatus directly and/or indirectly (by using cables and/or by radio) and using these multiple pieces of apparatus.

Figure 15:
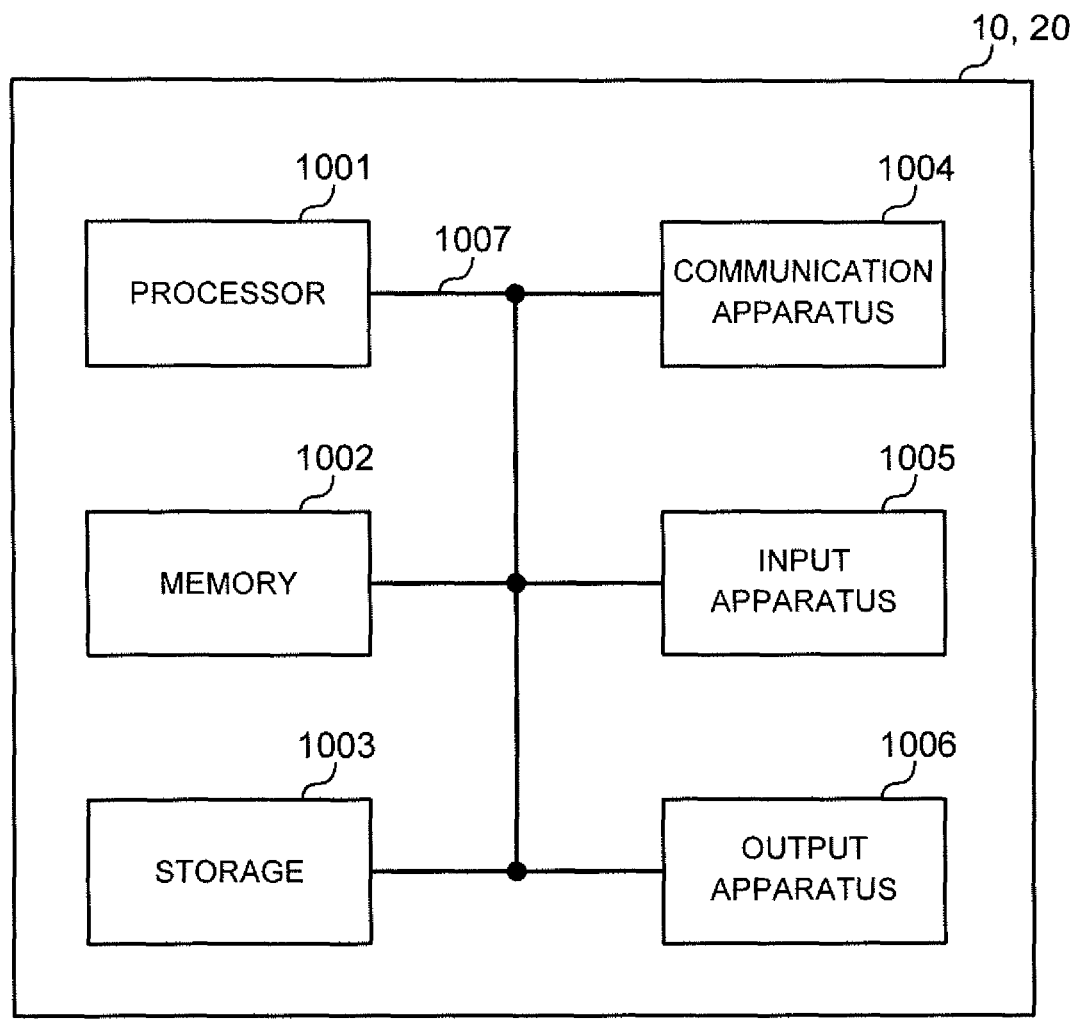
FIG. 15 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 15 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary from apparatus to apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," or one slot may be referred to as a "TTI" That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit for channel-encoded data packets (transport blocks), code blocks and/or codewords, or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are simply examples. For example, configurations such as the number of subframes included in a radio frame, the number of slots included in a subframe, the number of symbols and RBs included in a slot, the number of subcarriers included in an RB, the number of symbols in a TTI, the duration of symbols, the length of cyclic prefixes (CPs) and so on can be changed in a variety of ways.

Also, the information, parameters and so forth described in this specification may be represented in absolute values or in relative values with respect to predetermined values, or may be represented using other applicable information. For example, radio resources may be specified by predetermined indices. In addition, equations to use these parameters and so on may be used, apart from those explicitly disclosed in this specification.

The names used for parameters and/or others in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each example/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are by no means limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between elements may be physical, logical or a combination of these. For example, "connection" may be interpreted as "access." As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency range, the microwave range and/or the optical (both visible and invisible) range.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-192024, filed on Sep. 29, 2016, including the specification, drawings and abstract, is incorporated herein by reference in its entirety.

The invention claimed is:

1. A terminal comprising:
   a receiver that receives time interval information that indicates a time interval for monitoring a physical downlink control channel (PDCCH) and downlink control information, formatted in a downlink control information format, that includes blank resource information that indicates a blank resource; and
   a processor that controls rate matching of a physical downlink shared channel (PDSCH) based on the time interval information, the downlink control information format, and the blank resource information in the downlink control information,
   wherein the blank resource is a resource for the PDCCH,
   wherein a time interval in which the PDCCH is transmitted is different from the time interval in which the PDCCH is monitored, and
   the processor assumes that the PDSCH is not mapped to the blank resource.

2. The terminal according to claim 1, wherein the receiver receives the time interval information by higher layer signaling.

3. The terminal according to claim 1, wherein the receiver receives an information element including:
   the time interval information that indicates the time interval; and
   a number of resources to monitor corresponding to one or more aggregation levels for the downlink control information format.

4. A radio communication method for a terminal, comprising:
   receiving time interval information that indicates a time for monitoring a physical downlink control channel (PDCCH) and downlink control information, formatted in a downlink control information format, that includes blank resource information that indicates a blank resource; and
   controlling rate matching of a physical downlink shared channel (PDSCH) based on the time interval information, the format of the downlink control information, and the blank resource information in the downlink control information,
   wherein the blank resource is a resource for the PDCCH,
   wherein a time interval in which the PDCCH is transmitted is different from the time interval in which the PDCCH is monitored, and
   the terminal assumes that the PDSCH is not mapped to the blank resource.

5. A radio base station comprising:
   a transmitter that transmits time interval information that indicates a time interval for monitoring a physical downlink control channel (PDCCH) and downlink control information, formatted in a downlink control information format, that includes blank resource information that indicates a blank resource,
      wherein the transmitter transmits a physical downlink shared channel (PDSCH) to be rate matched based on the time interval information, the format of the downlink control information, and the blank resource information in the downlink control information; and
   a processor that controls such that the PDSCH is not mapped to the blank resource,
   wherein the blank resource is a resource for the PDCCH, and wherein a time interval in which the PDCCH is transmitted is different from the time interval in which the PDCCH is monitored.

6. A radio communication system comprising:
a radio base station; and
a terminal, wherein
the radio base station comprises:
   a transmitter that transmits time interval information that indicates a time interval for monitoring a physical downlink control channel (PDCCH) and downlink control information, formatted in a downlink control information format, that includes blank resource information that indicates a blank resource, wherein the transmitter transmits a physical downlink shared channel (PDSCH) to be rate matched based on the time interval information, the format of the downlink control information, and the blank resource information in the downlink control information; and
   a processor that controls such that the PDSCH is not mapped to the blank resource; and
the terminal comprises:
   a receiver that receives the time interval information and the downlink control information, formatted in the downlink control information format, that includes the blank resource information; and
   a processor that controls rate matching of the PDSCH based on the time interval information, the format of the downlink control information, and the blank resource information in the downlink control information and that assumes that the PDSCH is not mapped to the blank resource,
wherein the blank resource is a resource for the PDCCH, and
wherein a time interval in which the PDCCH is transmitted is different from the time interval in which the PDCCH is monitored.

7. The radio communication system according to claim 6, wherein the receiver receives an information element including:
   the time interval information that indicates the time interval; and
   a number of resources to monitor corresponding to one or more aggregation levels for the downlink control information format.

* * * * *